US012771201B2

(12) United States Patent
Wang et al.

(10) Patent No.: US 12,771,201 B2
(45) Date of Patent: Oct. 20, 2026

(54) AXIAL FLUX MACHINE AND STATOR FOR AXIAL FLUX MACHINE

(71) Applicant: High Tech Battery Inc., Taipei City (TW)

(72) Inventors: Kuei-Yung Wang, Taipei City (TW); Yu Hsuan Wu, Taipei City (TW); Quang Anh Nguyen, Taipei City (TW)

(73) Assignee: High Tech Battery Inc. (TW)

( * ) Notice: Subject to any disclaimer, the term of this patent is extended or adjusted under 35 U.S.C. 154(b) by 375 days.

(21) Appl. No.: 18/210,393

(22) Filed: Jun. 15, 2023

(65) Prior Publication Data

US 2024/0388159 A1 Nov. 21, 2024

(30) Foreign Application Priority Data

May 18, 2023 (GB) ..................................... 2307452

(51) Int. Cl.
*H02K 3/52* (2006.01)
*H02K 21/24* (2006.01)

(52) U.S. Cl.
CPC ............ *H02K 3/522* (2013.01); *H02K 21/24* (2013.01)

(58) Field of Classification Search
CPC .... H02K 1/182; H02K 21/24; H02K 2203/09; H02K 3/522
USPC ........................................................ 310/71
See application file for complete search history.

(56) References Cited

U.S. PATENT DOCUMENTS

| | | | | |
|---|---|---|---|---|
| 7,268,456 B2 * | 9/2007 | Harada | H02K 3/12 310/201 |
| 8,269,387 B2 * | 9/2012 | Endo | H02K 3/522 310/194 |
| 8,916,999 B2 * | 12/2014 | Imai | H02K 1/2746 310/179 |
| 9,748,813 B2 * | 8/2017 | Harada | H02K 3/345 |
| 9,780,616 B2 * | 10/2017 | Langford | H02K 3/522 |
| 10,090,723 B2 * | 10/2018 | Hashimoto | H02K 15/02 |
| 10,186,922 B2 * | 1/2019 | Schuler | H02K 11/30 |
| 10,256,693 B2 * | 4/2019 | Jang | H02K 5/225 |

(Continued)

FOREIGN PATENT DOCUMENTS

| | | | |
|---|---|---|---|
| CN | 114123586 A | 3/2022 | |
| DE | 10253072 A1 * | 5/2004 | H02K 1/182 |

(Continued)

OTHER PUBLICATIONS

Canadian Office Action with Examination Search Report, dated Dec. 20, 2023, issued in corresponding Canadian Application No. 3,203,519.

(Continued)

*Primary Examiner* — Alex W Mok
(74) *Attorney, Agent, or Firm* — OSTROLENK FABER LLP

(57) ABSTRACT

A stator 100, 200, 300, 400 for an axial flux machine that includes a plurality of stator bars 102, 202, 302 disposed generally radially around an axis X, a plurality of sets of winding 104, 204, 304, 404, 504, and electrical interconnects 106O, 106I, 206, 306, 406 electrically connected with the plurality of sets of winding 104, 204, 304, 404, 504. Each set of winding 104, 204, 304, 404, 504 is wound around a respective one of the stator bar 102, 202, 302 and is operable to generate a magnetic field generally parallel to the axis X.

23 Claims, 23 Drawing Sheets

(56) References Cited

U.S. PATENT DOCUMENTS

| | | | | |
|---|---|---|---|---|
| 10,756,600 | B2 * | 8/2020 | Tokoi | H02K 3/50 |
| 10,886,808 | B2 * | 1/2021 | Masuda | H02K 7/06 |
| 11,404,942 | B2 * | 8/2022 | Li | B66B 11/043 |
| 2005/0108870 | A1 * | 5/2005 | Harada | H02K 15/0414 29/606 |
| 2006/0043806 | A1 * | 3/2006 | Torii | H02K 3/522 310/194 |
| 2010/0201212 | A1 * | 8/2010 | Urano | H02K 3/18 310/71 |
| 2014/0028127 | A1 * | 1/2014 | Chamberlin | H02K 3/522 310/71 |
| 2014/0113472 | A1 * | 4/2014 | Chamberlin | H02K 3/50 439/212 |
| 2019/0234251 | A1 * | 8/2019 | Yokoyama | H02K 1/2793 |
| 2020/0220405 | A1 * | 7/2020 | Asahi | H02K 15/095 |
| 2021/0135530 | A1 * | 5/2021 | Yoneoka | H02K 3/522 |
| 2021/0257890 | A1 * | 8/2021 | Miyasaka | H02K 3/522 |
| 2022/0094229 | A1 * | 3/2022 | Lines | H02K 21/24 |

FOREIGN PATENT DOCUMENTS

| | | | | | |
|---|---|---|---|---|---|
| EP | 3483016 | A1 | * | 5/2019 | B60T 13/74 |
| GB | 2585357 | B | | 1/2021 | |
| JP | 2012244849 | A | * | 12/2012 | |
| JP | 2016-178833 | A | | 10/2016 | |
| JP | 2019-080453 | A | | 5/2019 | |
| WO | WO-2018084108 | A1 | * | 5/2018 | B60T 13/741 |

OTHER PUBLICATIONS

Extended European Search Report, dated Nov. 30, 2023, issued in corresponding European Application No. 23180600.1.

Great Britain Search and Examination Report, dated Oct. 30, 2023, issued in corresponding Application No. GB2307452.9.

* cited by examiner

AXIAL FLUX MACHINE AND STATOR FOR AXIAL FLUX MACHINE

CROSS-REFERENCE TO RELATED APPLICATIONS

The present application claims priority to Great Britain Application No. 2307452.9, filed May 18, 2023, the contents of which are incorporated herein by reference.

TECHNICAL FIELD

The invention relates to an axial flux machine and a stator for an axial flux machine.

BACKGROUND

Axial flux machines are known.

For example, GB2585357B has disclosed a stator having stator bars disposed circumferentially at intervals around an axis is provided. Each of the stator bars has a set of windings wound therearound for generating a magnetic field generally parallel to the axis. Radially outwardly disposed electrical interconnects for connecting two or more windings together are provided radially outwardly of the stator bars and extending circumferentially along at least a portion of the outer periphery of the stator bars. Radially inwardly disposed electrical interconnects for connecting two or more windings together are also provided radially inwardly of the stator bars and extending circumferentially along at least a portion of the inner periphery of the stator bars. The outer periphery of the stator is devoid of radially outwardly disposed interconnects along one or more portions. While the design in GB2585357B may provide greater power density within the machine form factor, the lack of interconnects along only one or some (i.e., not all) portions of the outer periphery of the stator does not provide a generally even reduction of the outer diameter of the stator or the stator housing, which may be undesirable in some applications.

In addition, in some existing axial flux machines, the assembly of windings and electrical interconnects of the stator may involve complicated procedures and/or the quality of connection of the windings and the electrical interconnects for different windings of the same stator may be inconsistent, both of which may be undesirable in some applications.

SUMMARY

In a first aspect, there is provided a stator for an axial flux machine. The stator comprises a plurality of stator bars disposed generally radially around an axis, a plurality of sets of windings, and electrical interconnects electrically connected with the plurality of sets of windings. Each set of windings is wound around a respective one of the plurality of stator bars and is operable to generate a respective magnetic field generally parallel to the axis.

The stator defines two (opposite) axial end faces. Each of the axial end faces may be arranged in a respective axial end plane generally perpendicular to the axis, and the two axial end planes may be generally parallel. The plurality of stator bars, the plurality of sets of windings, and the electrical interconnects are all disposed between the two axial end planes. In some embodiments, the two axial end faces are defined by the electrical interconnects. In some embodiments, the two axial end faces are defined by the plurality of stator bars. In some embodiments, the two axial end faces may be defined by other/different parts of the stator.

The electrical interconnects may comprise radially outwardly disposed electrical interconnects disposed radially outwardly of the plurality of stator bars. Each of the radially outwardly disposed electrical interconnects electrically connects two or more of the plurality of sets of windings together.

In some embodiments, the radially outwardly disposed electrical interconnects are collectively arranged circumferentially around or along the entire radially outer periphery of the plurality of stator bars. In other words, the radially outwardly disposed electrical interconnects, when all considered together, are arranged circumferentially around or along the entire radially outer periphery of the plurality of stator bars but at least one of the radially outwardly disposed electrical interconnects may not be arranged circumferentially around or along the entire radially outer periphery of the plurality of stator bars. Such arrangement of radially outwardly disposed electrical interconnects may enable a relatively even reduction of the outer dimension (e.g., diameter) of the stator or the stator housing. The reduction of outer dimension may in turn enable a more compact and/or lightweight stator, hence a more compact and/or lightweight axial flux machine that incorporates the stator.

In some embodiments, each of the radially outwardly disposed electrical interconnects is respectively arranged circumferentially along or around only a portion of the radially outer periphery of the plurality of stator bars.

In some embodiments, the radially outwardly disposed electrical interconnects are disposed such that: in front view, the radially outwardly disposed electrical interconnects are substantially entirely distributed on at least one generally circular path that has a center generally corresponding to the location of the axis.

In some embodiments, the radially outwardly disposed electrical interconnects are disposed such that: in front view, the radially outwardly disposed electrical interconnects are substantially entirely distributed on multiple generally circular paths, the multiple generally circular paths have different sizes (e.g., radii) and have generally the same center generally corresponding to the location of the axis.

In some embodiments, each of the radially outwardly disposed electrical interconnects respectively extends at least partly circumferentially around or along the radially outer periphery of the plurality of stator bars. In some embodiments, the radially outwardly disposed electrical interconnects include, at least: (a) one or more radially outwardly disposed electrical interconnects each respectively extending only circumferentially around or along a portion of the radially outer periphery of the plurality of stator bars, and/or (b) one or more radially outwardly disposed electrical interconnects each respectively extending circumferentially and axially around or along a portion of the radially outer periphery of the plurality of stator bars. The radially outwardly disposed electrical interconnect(s) of (b) make use of the axial space in the radially outer periphery for arranging the radially outwardly disposed electrical interconnects hence may enable a relatively effective or radially compact routing or arrangement or may reduce the outer dimension (e.g., diameter) of the stator or the stator housing.

In some embodiments, if the radially outwardly disposed electrical interconnects include multiple radially outwardly disposed electrical interconnects of (a), then one or more of the following may apply: some or all of the multiple radially outwardly disposed electrical interconnects of (a) may extend circumferentially with generally the same (generally constant) radial distance from the axis or with different (generally constant) radial distances from the axis; the multiple radially outwardly disposed electrical interconnects of (a) may be arranged on generally the same axial plane or different parallel axial planes perpendicular to the axis; some or all of the multiple radially outwardly disposed electrical interconnects of (a) may extend for generally the same length or for different lengths; etc.

In some embodiments, the one or more radially outwardly disposed electrical interconnects of (b) may each include, at least: a first circumferential portion that extends only circumferentially around or along a first portion of the outer periphery of the plurality of stator bars, a second circumferential portion that extends only circumferentially around or along a second portion of the outer periphery of the plurality of stator bars, and an axial-circumferential portion between the first and second circumferential portions and extends simultaneously axially and circumferentially around or along a portion of the outer periphery of the plurality of stator bars. One or more of the radially outwardly disposed electrical interconnects of (b) may further include one or more circumferential portions and/or one or more axial-circumferential portions. The first and second circumferential portions of generally the same radially outwardly disposed electrical interconnect: may be arranged on different parallel axial planes perpendicular to the axis; may extend circumferentially with generally the same (generally constant) radial distance from the axis or with different (generally constant) radial distances from the axis; and/or may extend for generally the same length or different lengths. In some embodiments, if the radially outwardly disposed electrical interconnects include multiple radially outwardly disposed electrical interconnects of (b), then one or more of the following may apply: some or all of the axial-circumferential portions of the multiple radially outwardly disposed electrical interconnects of (b) may extend for generally the same length or different lengths; some or all of the first circumferential portions of the multiple radially outwardly disposed electrical interconnects of (b) may extend on generally the same axial plane or different axial planes; some or all of the first circumferential portions of the multiple radially outwardly disposed electrical interconnects of (b) may extend for generally the same length or different lengths; some or all of the second circumferential portions of the multiple radially outwardly disposed electrical interconnects of (b) may extend on generally the same axial plane or different axial planes; some or all of the second circumferential portions of the multiple radially outwardly disposed electrical interconnects of (b) may extend for generally the same length or different lengths; some or all of the first circumferential portions and/or some or all of the second circumferential portions of the multiple radially outwardly disposed electrical interconnects of (b) may extend circumferentially with generally the same (generally constant) radial distance from the axis or with different (generally constant) radial distances from the axis; etc.

Optionally, the electrical interconnects further comprise: radially inwardly disposed electrical interconnects disposed radially inwardly of the plurality of stator bars. Each of the radially inwardly disposed electrical interconnects electrically connects two or more of the plurality of sets of windings together.

In some embodiments, the radially inwardly disposed electrical interconnects are collectively arranged circumferentially around or along the entire radially inner periphery of the plurality of stator bars. In other words, the radially inwardly disposed electrical interconnects, when all considered together, are arranged circumferentially around or along the entire radially inner periphery of the plurality of stator bars but at least one of the radially inwardly disposed electrical interconnects may not be arranged circumferentially around or along the entire radially inner periphery of the plurality of stator bars. Such arrangement of radially inwardly disposed electrical interconnects may enable a relative effective use of the radially inner space defined by the stator bars/windings.

In some embodiments, each of the radially inwardly disposed electrical interconnects is respectively arranged circumferentially along or around only a portion of the radially inner periphery of the plurality of stator bars.

In some embodiments, the radially inwardly disposed electrical interconnects are disposed such that: in front view, the radially inwardly disposed electrical interconnects are substantially entirely distributed on at least one (e.g., a single) generally circular path that has a center generally corresponding to the location of the axis.

In some embodiments, the radially inwardly disposed electrical interconnects are disposed such that: in front view, the radially inwardly disposed electrical interconnects are substantially entirely distributed on multiple generally circular paths, the multiple generally circular paths have different sizes (e.g., radii) and have generally the same center generally corresponding to the location of the axis.

In some embodiments, each of the radially inwardly disposed electrical interconnects respectively extends at least partly circumferentially around or along the radially inner periphery of the plurality of stator bars. In some embodiments, the radially inwardly disposed electrical interconnects include, at least: (a) one or more radially inwardly disposed electrical interconnects each respectively extending only circumferentially around or along a portion of the radially inner periphery of the plurality of stator bars, and/or (b) one or more radially inwardly disposed electrical interconnects each respectively extending circumferentially and axially around or along a portion of the radially inner periphery of the plurality of stator bars. The radially inwardly disposed electrical interconnect(s) of (b) make use of the axial space in the radially inner periphery for arranging the radially inwardly disposed electrical interconnects hence may enable a relatively effective or radially compact routing or arrangement.

In some embodiments, if the radially inwardly disposed electrical interconnects include multiple radially inwardly disposed electrical interconnects of (a), then one or more of the following may apply: some or all of the multiple radially inwardly disposed electrical interconnects of (a) may extend circumferentially with generally the same (generally constant) radial distance from the axis or with different (generally constant) radial distances from the axis; the multiple radially inwardly disposed electrical interconnects of (a) may be arranged on generally the same axial plane or different parallel axial planes perpendicular to the axis; some or all of the multiple radially inwardly disposed electrical interconnects of (a) may extend for generally the same length or for different lengths; etc.

In some embodiments, the one or more radially inwardly disposed electrical interconnects of (b) may each include, at least: a first circumferential portion that extends only circumferentially around or along a first portion of the inner periphery of the plurality of stator bars, a second circumferential portion that extends only circumferentially around or along a second portion of the inner periphery of the plurality of stator bars, and an axial-circumferential portion between the first and second circumferential portions and extends simultaneously axially and circumferentially around or along a portion of the inner periphery of the plurality of stator bars. One or more of the radially inwardly disposed electrical interconnects of (b) may further include one or more circumferential portions and/or one or more axial-circumferential portions. The first and second circumferential portions of generally the same radially inwardly disposed electrical interconnect: may be arranged on different parallel axial planes perpendicular to the axis; may extend circumferentially with generally the same (generally constant) radial distance from the axis or with different (generally constant) radial distances from the axis; and/or may extend for generally the same length or different lengths. In some embodiments, if the radially inwardly disposed electrical interconnects include multiple radially inwardly disposed electrical interconnects of (b), then one or more of the following may apply: some or all of the axial-circumferential portions of the multiple radially inwardly disposed electrical interconnects of (b) may extend for generally the same length or different lengths; some or all of the first circumferential portions of the multiple radially inwardly disposed electrical interconnects of (b) may extend on generally the same axial plane or different axial planes; some or all of the first circumferential portions of the multiple radially inwardly disposed electrical interconnects of (b) may extend for generally the same length or different lengths; some or all of the second circumferential portions of the multiple radially inwardly disposed electrical interconnects of (b) may extend on generally the same axial plane or different axial planes; some or all of the second circumferential portions of the multiple radially inwardly disposed electrical interconnects of (b) may extend for generally the same length or different lengths; some or all of the first circumferential portions and/or some or all of the second circumferential portions of the multiple radially inwardly disposed electrical interconnects of (b) may extend circumferentially with generally the same (generally constant) radial distance from the axis or with different (generally constant) radial distances from the axis; etc.

Optionally, the electrical interconnects consist only of the radially outwardly disposed electrical interconnects disposed radially outwardly of the plurality of stator bars, and the stator is completely devoid of radially inwardly disposed electrical interconnect disposed radially inwardly of the plurality of stator bars.

Optionally, the electrical interconnects comprise or consist only of radially outwardly disposed electrical interconnects disposed radially outwardly of the plurality of sets of windings. Each of the radially outwardly disposed electrical interconnects electrically connects two or more of the plurality of sets of windings together.

In some embodiments, the radially outwardly disposed electrical interconnects are collectively arranged around or along (e.g., circumferentially) the entire radially outer periphery of the plurality of sets of windings. In other words, the radially outwardly disposed electrical interconnects, when all considered together, are arranged around or along (e.g., circumferentially) the entire radially outer periphery of the plurality of sets of windings but at least one of the radially outwardly disposed electrical interconnects may not be arranged around or along (e.g., circumferentially) the entire radially outer periphery of the plurality of sets of windings.

In some embodiments, the radially outwardly disposed electrical interconnects include, at least: (a) one or more radially outwardly disposed electrical interconnects each respectively extending only circumferentially around or along at least a portion of the radially outer periphery of the plurality of sets of windings, and (b) a plurality of radially outwardly disposed electrical interconnects each respectively extending circumferentially and axially around or along a portion of the radially outer periphery of the plurality of sets of windings. In some embodiments, the one or more radially outwardly disposed electrical interconnects of (b) may each include, at least: a circumferential portion that extends only circumferentially around or along a portion of the inner periphery of the plurality of sets of windings, and two axial portions that extend only axially around or along a portion of the inner periphery of the plurality of sets of windings. The plurality of radially outwardly disposed electrical interconnects of (b) may be coupled to the one or more radially outwardly disposed electrical interconnects of (a) and are angularly distributed about the axis.

Optionally, the plurality of sets of windings are wound in the same sense.

Optionally, the plurality of sets of windings comprise a plurality of sets of windings wound in a first sense and a plurality of sets of windings wound in a second sense opposite the first sense. The first sense may be clockwise and the second sense may be anti-clockwise, or vice versa.

Optionally, the plurality of sets of windings comprises a plurality of first pairs of sets of windings wound in the first sense and a plurality of second pairs of sets of windings wound in the second sense. Each first pair of sets of windings including two sets of windings disposed immediately adjacent each other. Each second pair of sets of windings including two sets of windings disposed immediately adjacent each other. The plurality of first pairs of sets of windings and the plurality of second pairs of sets of windings may be arranged in an interleaved manner (e.g., for 8 consecutive winding sets #1-#8: winding sets #1, #2, #5, #6=first sense; winding sets #3, #4, #7, #8=second sense).

The plurality of sets of windings are each respectively formed by: a main winding portion formed by one or more coil loops, a first end portion extending directly from the main winding portion, and a second end portion extending directly from the main winding portion. The main winding portion, the first end portion, and the second end portion may be integrally formed. The first end portion and the second end portion of the same set of windings may have generally the same or different lengths.

Optionally, the first end portion includes a portion engaged with (e.g., welded to, soldered to, etc.) one or more portions of the electrical interconnects. In some embodiments, the portion of the first end portion comprises a generally U-shaped portion for hooking onto one or more portions of the electrical interconnects. The generally U-shaped portion may at least partly extend inwardly towards a center axial plane defined by the main winding portion. In some embodiments, the portion of the first end portion comprises a generally L-shaped portion. The generally L-shaped portion may include: a first portion extending generally outwardly with respect to the axis, and a second portion extending generally axially (parallel to the axis) away from the center axial plane defined by the main winding portion. The second portion may be engaged with (e.g., welded to, soldered to, etc.) one or more corresponding portions of the electrical interconnects. In some embodiments, the portion of the first end portion comprises a generally straight portion. The generally straight portion may extend generally outwardly with respect to the axis and may be engaged with (e.g., welded to, soldered to, etc.) one or more corresponding portions of the electrical interconnects.

Optionally, the second end portion includes a portion engaged with (e.g., welded to, soldered to, etc.) one or more portions of the electrical interconnects. In some embodiments, the portion of the second end portion comprises a generally U-shaped portion for hooking onto one or more portions of the electrical interconnects. The generally U-shaped portion may at least partly extend inwardly towards a center axial plane defined by the main winding portion. In some embodiments, the portion of the first end portion comprises a generally L-shaped portion. The generally L-shaped portion may include: a first portion extending generally outwardly with respect to the axis, and a second portion extending generally axially (parallel to the axis) away from the center axial plane defined by the main winding portion. The second portion may be engaged with (e.g., welded to, soldered to, etc.) one or more corresponding portions of the electrical interconnects. In some embodiments, the portion of the second end portion comprises a generally straight portion. The generally straight portion may extend generally outwardly with respect to the axis and may be engaged with (e.g., welded to, soldered to, etc.) one or more corresponding portions of the electrical interconnects.

Optionally, the first end portion and the second end portion of the same set of windings are disposed on opposite lateral sides of the corresponding set of windings. Optionally, the first end portion and the second end portion of the same set of windings are disposed on generally the same lateral side of the corresponding set of windings. Optionally, the first end portion and the second end portion of the same set of windings are disposed in a mid-plane that is defined by the corresponding set of windings. The mid-plane is generally parallel to the axis and generally perpendicular to the axial plane.

Optionally, the first end portion and the second end portion of the same set of windings are disposed radially outwardly of the corresponding stator bar.

Optionally, the first end portion and the second end portion of the same set of windings are disposed one radially outwardly of the corresponding stator bar and another one radially inwardly of the corresponding stator bar.

Optionally, the first end portion and the second end portion of the same set of windings are disposed radially inwardly of the corresponding electrical interconnect.

Optionally, the plurality of sets of windings are electrically connected, via the electrical interconnects, in a multi-phase arrangement. The multi-phase arrangement may be a three-phase arrangement.

Optionally, the stator further comprises a plurality of stator terminals (phase terminals), such as three stator terminals, electrically connected with at least some of the radially outwardly disposed electrical interconnects.

Optionally, the plurality of stator bars define a center axial plane generally perpendicular to the axis. The center axial plane may be between and generally parallel to the two axial end planes.

Optionally, the plurality of stator terminals extend generally outwardly with respect to the axis and generally parallel to the center axial plane.

Optionally, the plurality of stator terminals extend in a single axial plane axially offset from and generally parallel to the center axial plane.

Optionally, the plurality of stator terminals extend in multiple axial planes that are axially offset from and generally parallel to the center axial plane.

Optionally, the stator further comprises a stator housing at least partly receiving the plurality of stator bars, the plurality of sets of windings, and the electrical interconnects. The stator housing may define or provide one or more openings through which the plurality of stator terminals extend. In some embodiments, the stator housing defines or provides a single opening through which the plurality of stator terminals extend. In some embodiments, the stator housing defines or provides multiple openings through which the plurality of stator terminals extend.

Optionally, each respective stator bar comprises: a bar portion extending generally parallel to the axis and on which the corresponding set of windings is wound, and a shoe portion at an axial end of the bar portion for confining the corresponding set of windings wound around the bar portion. In some examples, each respective stator bar comprises: a bar portion extending generally parallel to the axis and on which the corresponding set of windings is wound, and two shoe portions each at a respective axial end of the bar portion for confining the corresponding set of windings wound around the bar portion.

Optionally, a cross section of the electrical interconnects is rectangular, squared, or rounded.

In a second aspect, there is provided an axial flux machine. The axial flux machine includes, at least: a stator of the first aspect, and a rotor. The axial flux machine may be a motor or a generator.

In one example, the axial flux machine includes a stator and a rotor arranged at one axial end of the stator. The stator and the rotor may be arranged co-axially, e.g., with respect to the axis the plurality of stator bars are disposed generally radially around.

In another example, the axial flux machine includes a stator, a first rotor arranged at a first axial end of the stator, and a second rotor arranged at a second axial end of the stator opposite the first axial end of the stator. The stator, the first rotor, and the second rotor may be arranged co-axially, e.g., with respect to the axis the plurality of stator bars are disposed generally radially around.

In a third aspect, there is provided an electrical device or system including an axial flux machine of the second aspect.

Other features and aspects will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc. For example, the expression "generally radially" is used to imply that strict radial sense is not required (and difficult if not impossible in practice); the expression "generally circular" is used to imply that strict circular shape/form is not required (and difficult if not impossible in practice); etc.

Unless otherwise specified, the terms "connected", "coupled", "mounted", or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which.

DETAILED DESCRIPTION

Figure 1:
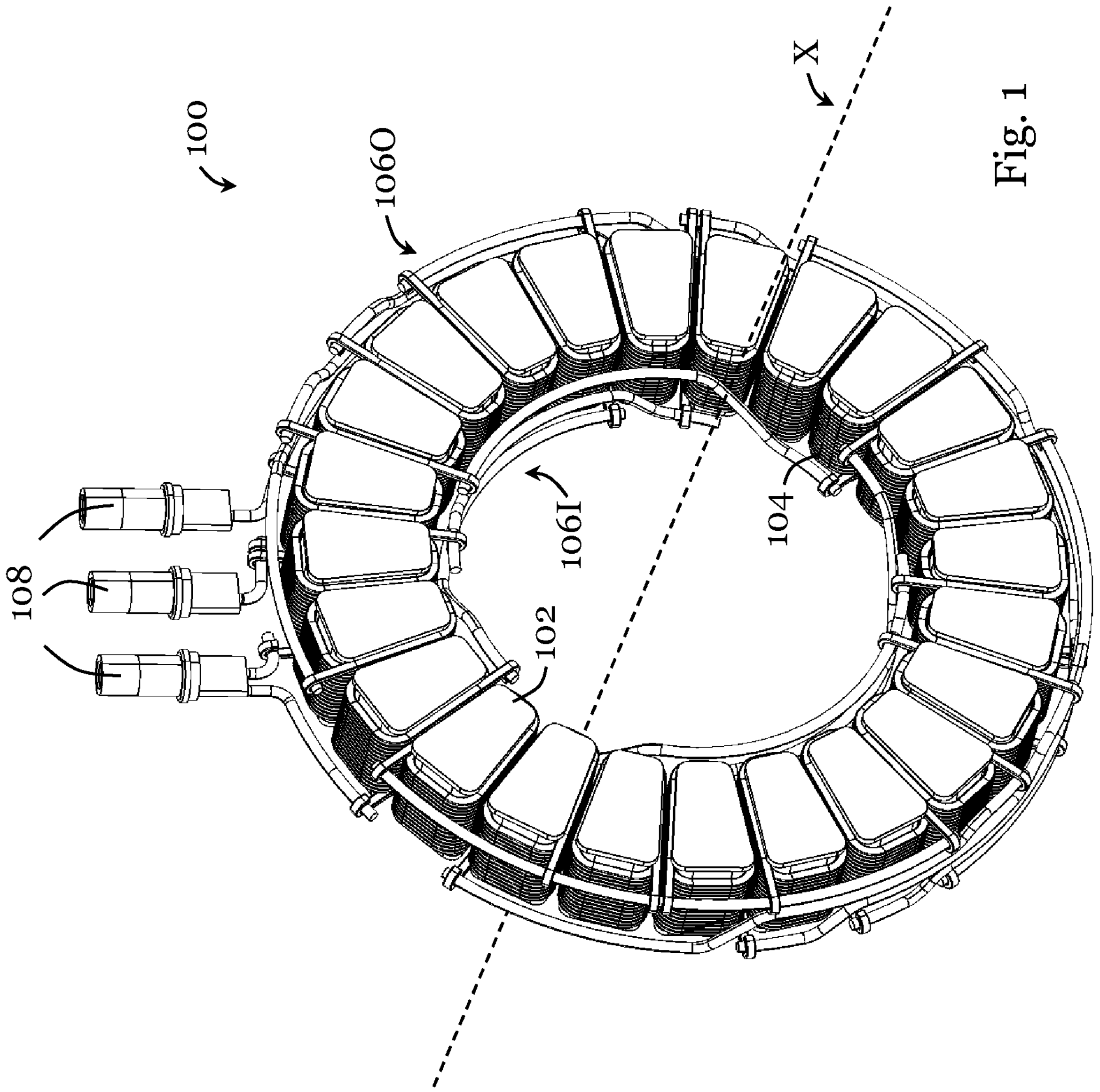
FIG. 1 is a perspective view of a stator in one embodiment of the invention.

FIGS. 1-13 show a stator 100 for an axial flux machine in one embodiment of the invention. The stator 100 generally includes twenty-four stator bars 102 disposed generally radially around and circumferentially spaced about axis X, corresponding twenty-four sets of windings 104 each wound around a respective stator bar 102 and operable to generate (e.g., when energized) a respective magnetic field generally parallel to the axis X, and electrical interconnects 106O, 106I electrically connected with the twenty-four sets of windings 104. The axis X may correspond to a rotation axis of a rotor arranged at an axial end of the stator. The stator 100 also includes three stator terminals 108 electrically connected with some of the electrical interconnects 106O.

Figure 2:
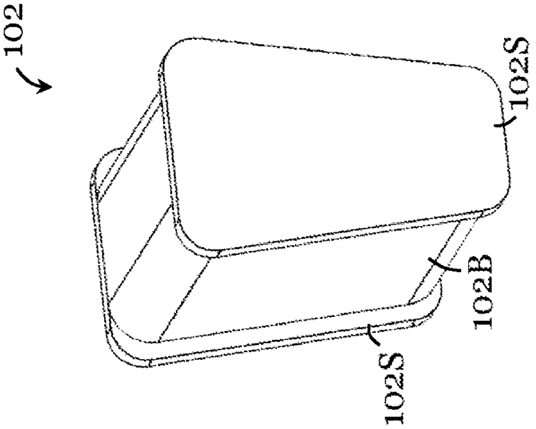
FIG. 2 is a perspective view of a stator bar of the stator of FIG. 1.

In this embodiment, the construction of the twenty-four stator bars 102 are generally the same. Referring to FIG. 1, each of the stator bar 102 generally extends axially in a direction generally parallel to axis X. Referring to FIG. 2, the stator bar 102 includes a bar portion 102B extending generally parallel to the axis and two shoe portions 102S at two axial ends of the bar portion 102B. The bar portion 102B enables windings of a corresponding set of windings 104 thereon whereas the shoe portions 102S confine the corresponding set of windings 104 on the bar portion 102B.

In this embodiment, the twenty-four sets of windings 104 are arranged in different configurations, as illustrated in FIGS. 3A to 8B. Generally, each set of windings 104 is respectively formed by: a main winding portion formed by one or more coil loops and two end portions extending away from the main winding portion. The main winding portion and the two end portions may be integrally formed or provided by a continuous wire. Each set of windings 104 is wound substantially entirely on the bar portion 102B of the stator bar 102.

Figure 3B:
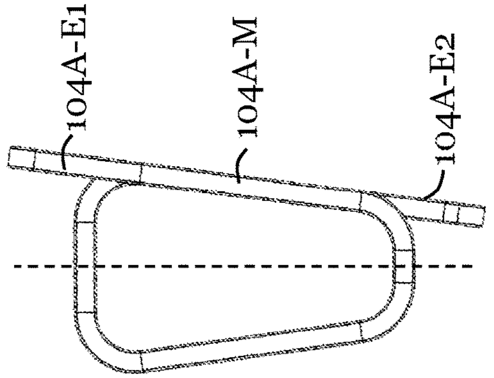
FIG. 3B is a front view of the set of windings of FIG. 3A.
Figure 3A:
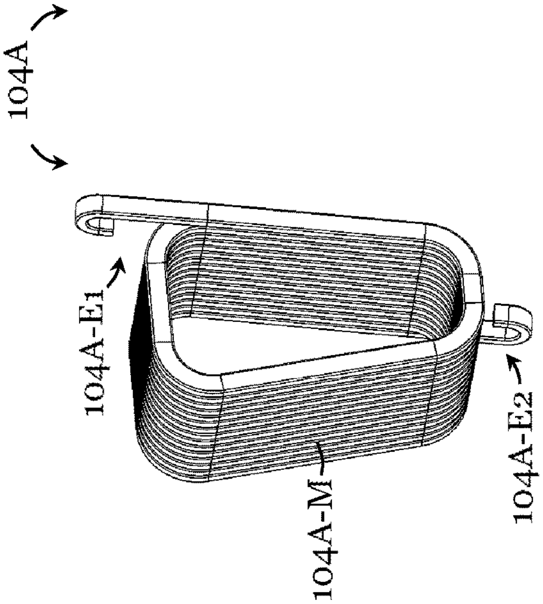
FIG. 3A is a perspective view of a set of windings of the stator of FIG. 1.

Referring to FIGS. 1, 3A, and 3B, in one configuration, the set of windings 104A includes a main winding portion 104A-M formed by multiple coil loops, one end portion 104A-E1 arranged near the front axial end of the main winding portion 104A-M and disposed radially outwardly of the corresponding stator bar, and another end portion 104A-E2 arranged near the rear axial end of the main winding portion 104A-M and disposed radially inwardly of the corresponding stator bar. The end portion 104A-E1 extends generally radially outwardly away from the main winding portion 104A-M whereas the end portion 104A-E2 extends generally radially inwardly away from the main winding portion 104A-M. As shown in FIG. 3B, the two end portions 104A-E1, 104A-E2 are disposed on generally the right side (relative to the mid-plane defined by the main winding portion 104A-M, being generally parallel to the axis X and generally perpendicular to the center axial plane defined by the main winding portion 104A-M). The two end portions 104A-E1, 104A-E2 have generally the same extent of extension (length). As shown in FIGS. 1 and 3A, the end portion 104A-E1 includes a generally U-shaped hook portion engaged with (e.g., welded to, soldered to, etc.) one or more portions of the electrical interconnects 106O and the end portion 104A-E2 includes a generally U-shaped hook portion engaged with (e.g., welded to, soldered to, etc.) one or more portions of the electrical interconnects 106I. The generally U-shaped hook portions each respectively extend inwardly towards the center axial plane (perpendicular to axis X) defined by the main winding portion 104A-M.

Figure 4B:
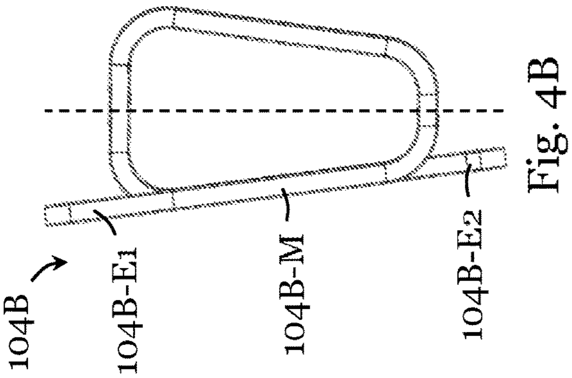
FIG. 4B is a front view of the set of windings of FIG. 4A.
Figure 4A:
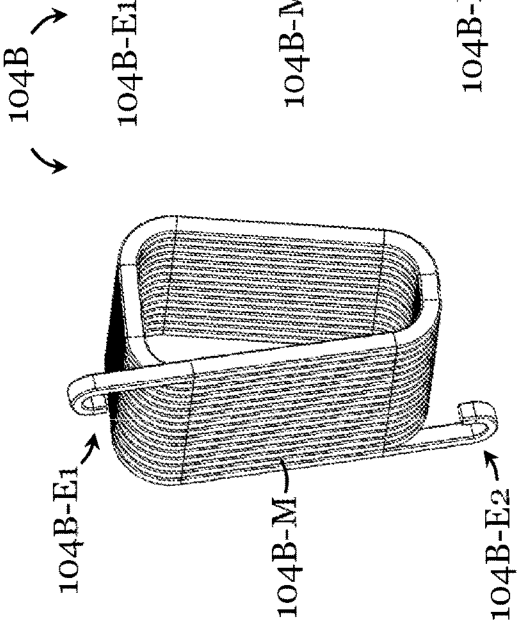
FIG. 4A is a perspective view of a set of windings of the stator of FIG. 1.

Referring to FIGS. 1, 4A, and 4B, in one configuration, the set of windings 104B includes a main winding portion 104B-M formed by multiple coil loops, one end portion 104B-E1 arranged near the front axial end of the main winding portion 104B-M and disposed radially outwardly of the corresponding stator bar, and another end portion 104B-E2 arranged near the rear axial end of the main winding portion 104B-M and disposed radially inwardly of the corresponding stator bar. The end portion 104B-E1 extends generally radially outwardly away from the main winding portion 104B-M whereas the end portion 104B-E2 extends generally radially inwardly away from the main winding portion 104B-M. As shown in FIG. 4B, the two end portions 104B-E1, 104B-E2 are disposed on generally the left side (relative to the mid-plane defined by the main winding portion 104B-M, being generally parallel to the axis X and generally perpendicular to the center axial plane defined by the main winding portion 104B-M). The two end portions 104B-E1, 104B-E2 have generally the same extent of extension (length). As shown in FIGS. 1 and 4A, the end portion 104B-E1 includes a generally U-shaped hook portion engaged with (e.g., welded to, soldered to, etc.) one or more portions of the electrical interconnects 106O and the end portion 104B-E2 includes a generally U-shaped hook portion engaged with (e.g., welded to, soldered to, etc.) one or more portions of the electrical interconnects 106I. The generally U-shaped hook portions each respectively extend inwardly towards the center axial plane (perpendicular to axis X) defined by the main winding portion 104B-M.

Figure 5A:
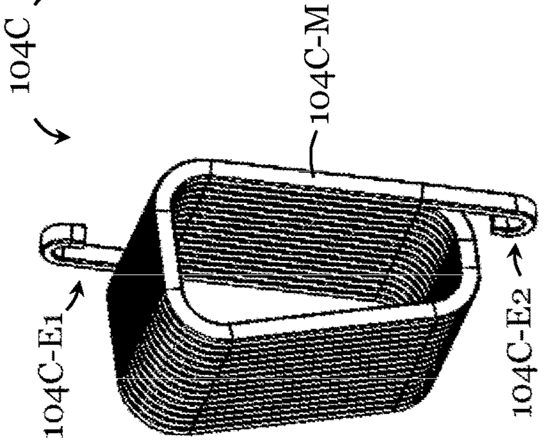
FIG. 5A is a perspective view of a set of windings of the stator of FIG. 1.
Figure 5B:
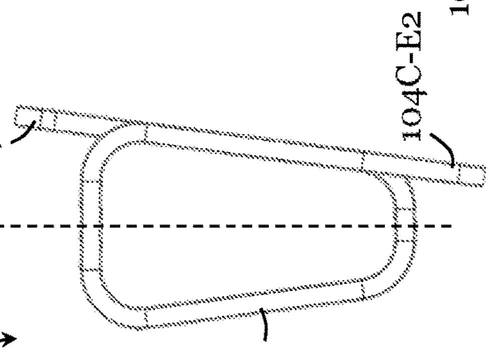
FIG. 5B is a front view of the set of windings of FIG. 5A.

Referring to FIGS. 1, 5A, and 5B, in one configuration, the set of windings 104C includes a main winding portion 104C-M formed by multiple coil loops, one end portion 104C-E1 arranged near the rear axial end of the main winding portion 104C-M and disposed radially outwardly of the corresponding stator bar, and another end portion 104C-E2 arranged near the front axial end of the main winding portion 104C-M and disposed radially inwardly of the corresponding stator bar. The end portion 104C-E1 extends generally radially outwardly away from the main winding portion 104C-M whereas the end portion 104C-E2 extends generally radially inwardly away from the main winding portion 104C-M. As shown in FIG. 5B, the two end portions 104C-E1, 104C-E2 are disposed on generally the right side (relative to the mid-plane defined by the main winding portion 104C-M, being generally parallel to the axis X and generally perpendicular to the center axial plane defined by the main winding portion 104C-M). The two end portions 104C-E1, 104C-E2 have generally the same extent of extension (length). As shown in FIGS. 1 and 5A, the end portion 104C-E1 includes a generally U-shaped hook portion engaged with (e.g., welded to, soldered to, etc.) one or more portions of the electrical interconnects 106O and the end portion 104C-E2 includes a generally U-shaped hook portion engaged with (e.g., welded to, soldered to, etc.) one or more portions of the electrical interconnects 106I. The generally U-shaped hook portions each respectively extend inwardly towards the center axial plane (perpendicular to axis X) defined by the main winding portion 104C-M.

Figure 6A:
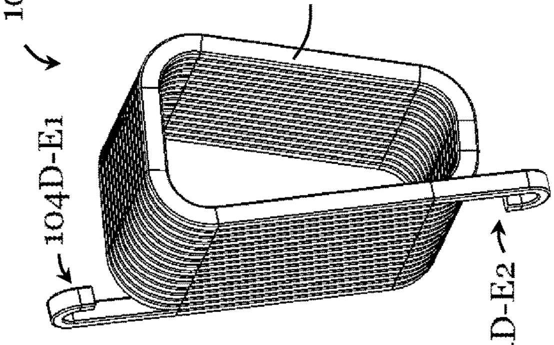
FIG. 6A is a perspective view of a set of windings of the stator of FIG. 1.
Figure 6B:
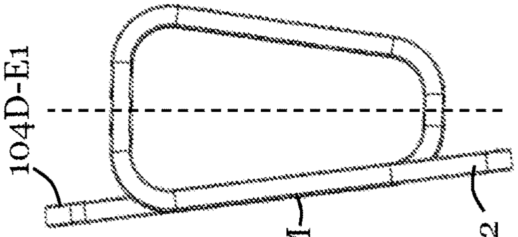
FIG. 6B is a front view of the set of windings of FIG. 6A.

Referring to FIGS. 1, 6A, and 6B, in one configuration, the set of windings 104D includes a main winding portion 104D-M formed by multiple coil loops, one end portion 104D-E1 arranged near the rear axial end of the main winding portion 104D-M and disposed radially outwardly of the corresponding stator bar, and another end portion 104D-E2 arranged near the front axial end of the main winding portion 104D-M and disposed radially inwardly of the corresponding stator bar. The end portion 104D-E1 extends generally radially outwardly away from the main winding portion 104D-M whereas the end portion 104D-E2 extends generally radially inwardly away from the main winding portion 104D-M. As shown in FIG. 6B, the two end portions 104D-E1, 104D-E2 are disposed on generally the left side (relative to the mid-plane defined by the main winding portion 104D-M, being generally parallel to the axis X and generally perpendicular to the center axial plane defined by the main winding portion 104D-M). The two end portions 104D-E1, 104D-E2 have generally the same extent of extension (length). As shown in FIGS. 1 and 6A, the end portion 104D-E1 includes a generally U-shaped hook portion engaged with (e.g., welded to, soldered to, etc.) one or more portions of the electrical interconnects 106O and the end portion 104D-E2 includes a generally U-shaped hook portion engaged with (e.g., welded to, soldered to, etc.) one or more portions of the electrical interconnects 106I. The generally U-shaped hook portions each respectively extend inwardly towards the center axial plane (perpendicular to axis X) defined by the main winding portion 104D-M.

Figure 7A:
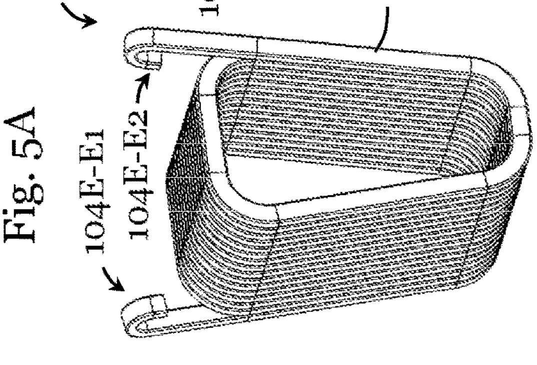
FIG. 7A is a perspective view of a set of windings of the stator of FIG. 1.
Figure 7B:
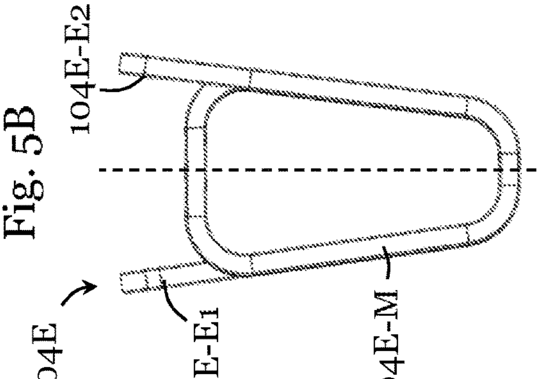
FIG. 7B is a front view of the set of windings of Fig. A.

Referring to FIGS. 1, 7A, and 7B, in one configuration, the set of windings 104E includes a main winding portion 104E-M formed by multiple coil loops, one end portion 104E-E1 arranged near the rear axial end of the main winding portion 104E-M and disposed radially outwardly of the corresponding stator bar, and another end portion 104E-E2 arranged near the front axial end of the main winding portion 104E-M and disposed radially outwardly of the corresponding stator bar. Both end portions 104E-E1, 104E-E2 extend generally radially outwardly away from the main winding portion 104E-M. As shown in FIG. 7B, the two end portions 104E-E1, 104E-E2 are disposed on generally opposite sides (relative to the mid-plane defined by the main winding portion 104E-M, being generally parallel to the axis X and generally perpendicular to the center axial plane defined by the main winding portion 104E-M). The two end portions 104E-E1, 104E-E2 have generally the same extent of extension (length). As shown in FIGS. 1 and 7A, the end portion 104E-E1 includes a generally U-shaped hook portion engaged with (e.g., welded to, soldered to, etc.) one or more portions of the electrical interconnects 106O and the end portion 104E-E2 includes a generally U-shaped hook portion engaged with (e.g., welded to, soldered to, etc.) one or more portions of the electrical interconnects 106O. The generally U-shaped hook portions each respectively extend inwardly towards the center axial plane (perpendicular to axis X) defined by the main winding portion 104E-M.

Figure 8A:
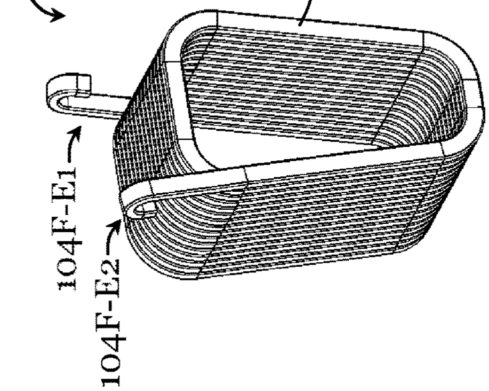
FIG. 8A is a perspective view of a set of windings of the stator of FIG. 1.
Figure 8B:
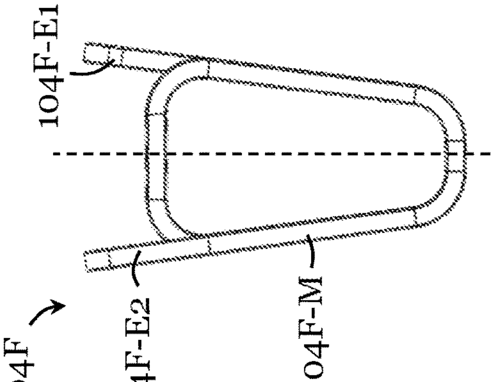
FIG. 8B is a front view of the set of windings of FIG. 8A.

Referring to FIGS. 1, 8A, and 8B, in one configuration, the set of windings 104F includes a main winding portion 104F-M formed by multiple coil loops, one end portion 104F-E1 arranged near the front axial end of the main winding portion 104F-M and disposed radially outwardly of the corresponding stator bar, and another end portion 104F-E2 arranged near the rear axial end of the main winding portion 104F-M and disposed radially outwardly of the corresponding stator bar. Both end portions 104F-E1, 104F-E2 extend generally radially outwardly away from the main winding portion 104E-M. As shown in FIG. 8B, the two end portions 104F-E1, 104F-E2 are disposed on generally the right side (relative to the mid-plane defined by the main winding portion 104F-M, being generally parallel to the axis X and generally perpendicular to the center axial plane defined by the main winding portion 104F-M). The two end portions 104F-E1, 104F-E2 have generally the same extent of extension (length). As shown in FIGS. 1 and 8A, the end portion 104F-E1 includes a generally U-shaped hook portion engaged with (e.g., welded to, soldered to, etc.) one or more portions of the electrical interconnects 106O and the end portion 104F-E2 includes a generally U-shaped hook portion engaged with (e.g., welded to, soldered to, etc.) one or more portions of the electrical interconnects 106O. The generally U-shaped hook portions each respectively extend inwardly towards the center axial plane (perpendicular to axis X) defined by the main winding portion 104F-M.

While FIGS. 3A to 8B separately illustrate six winding configurations, it will be appreciated that the winding configuration in FIGS. 6A and 6B can be considered as a rotated version of the winding configuration in FIGS. 3A and 3B, and the winding configuration in FIGS. 4A and 4B can be considered as a rotated version of the winding configuration in FIGS. 5A and 5B.

FIGS. 9A to 11B illustrate the configuration of the electrical interconnects 106O, 106I in this embodiment. In this embodiment, the electrical interconnects include radially outwardly disposed electrical interconnects 106O disposed radially outwardly of the stator bars 102 and radially inwardly disposed electrical interconnects 106I disposed radially inwardly of the stator bars 102. Each of the radially outwardly disposed electrical interconnects 106O electrically connects two or more of the sets of windings 104 together, via the hook portions of the sets of windings 104. Each of the radially inwardly disposed electrical interconnects 106I electrically connects two or more of the sets of windings 104 together, via the hook portions of the sets of windings 104. In this embodiment, the electrical interconnects 106O, 106I are provided by wires with a generally circular cross section.

Figure 9B:
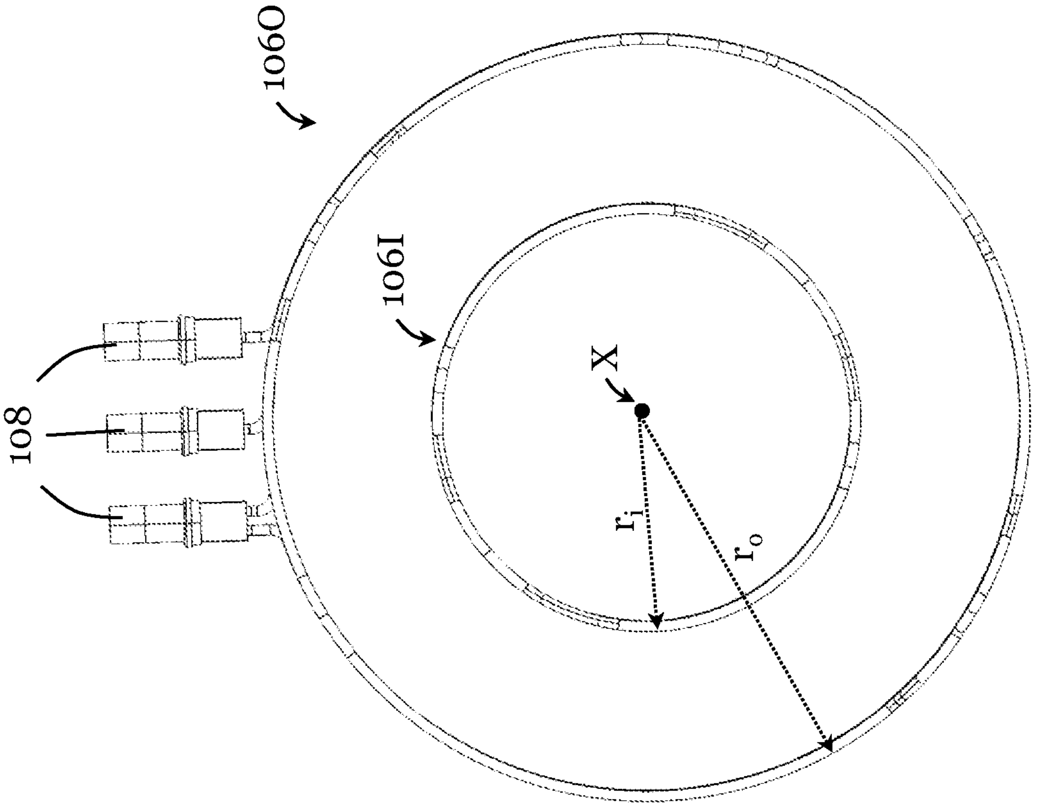
FIG. 9B is a front view of the part of the stator of FIG. 9A.
Figure 9A:
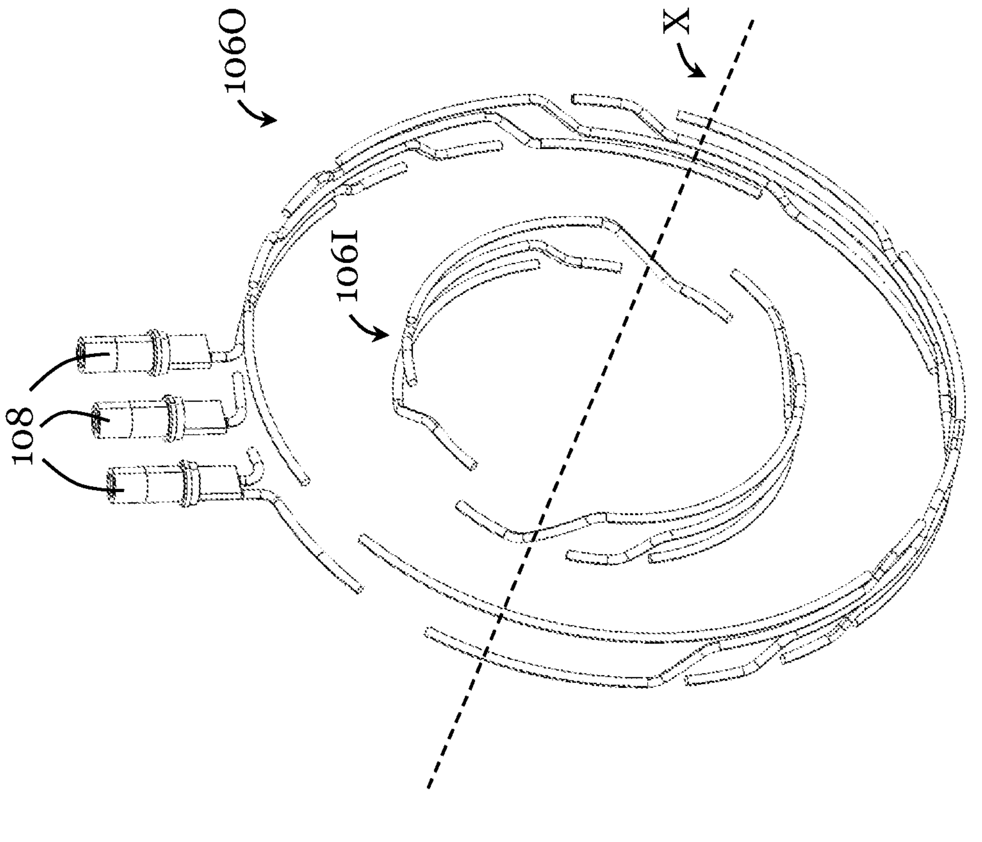
FIG. 9A is a perspective view of the electrical interconnects and the stator terminals of the stator of FIG. 1.

Referring to FIGS. 9A and 9B, in this embodiment, the radially outwardly disposed electrical interconnects 106O are collectively arranged circumferentially around or along the entire radially outer periphery of the stator bars 102 such that the radially outwardly disposed electrical interconnects 106O, when all considered together, are arranged circumferentially around or along the entire radially outer periphery of the stator bars 102 but none of the radially outwardly disposed electrical interconnects 106O alone is arranged circumferentially around or along the entire radially outer periphery of the stator bars 102. Also, the radially inwardly disposed electrical interconnects 106I are collectively arranged circumferentially around or along the entire radially inner periphery of the stator bars 102 such that the radially inwardly disposed electrical interconnects 106I, when all considered together, are arranged circumferentially around or along the entire radially inner periphery of the stator bars 102 but none of the radially inwardly disposed electrical interconnects 106I alone is arranged circumferentially around or along the entire radially inner periphery of the stator bars 102. In this embodiment, the electrical interconnects 106O, 106I are disposed such that: in front view (FIG. 9B), the radially outwardly disposed electrical interconnects 106O (e.g., except for the interconnect portions 106T coupled with the stator terminals 108) are substantially entirely distributed on a single generally circular path that has a center generally corresponding to the location of the axis X and has a radius $r_o$ whereas the radially inwardly disposed electrical interconnects 106I are substantially entirely distributed on a single generally circular path that has a center generally corresponding to the location of the axis X and has a radius $r_i$ smaller than radius $r_o$.

Figure 10A:
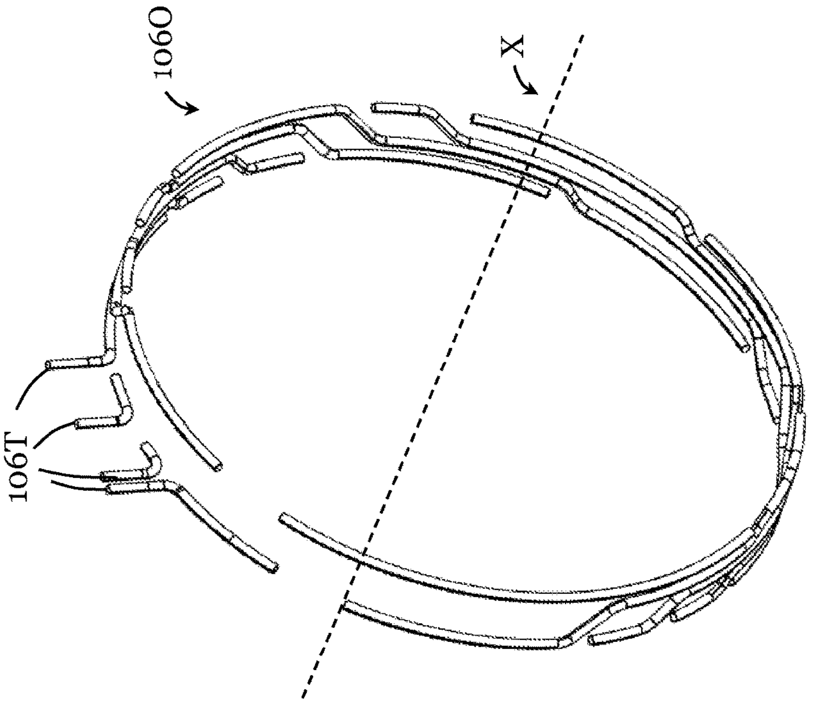
FIG. 10A is a perspective view of the radially outwardly disposed electrical interconnects of the stator of FIG. 1.
Figure 10B:
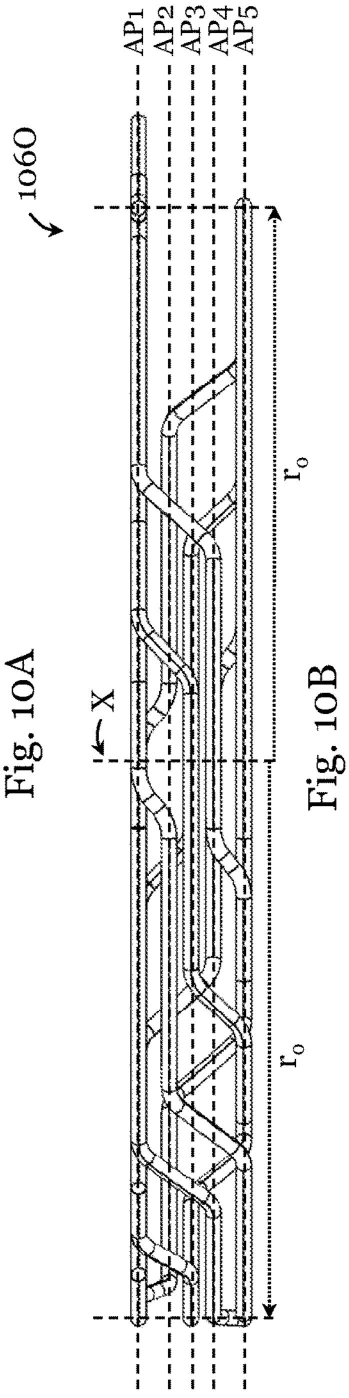
FIG. 10B is a side view of the radially outwardly disposed electrical interconnects of FIG. 10A.

FIGS. 10A and 10B illustrate the radially outwardly disposed electrical interconnects 106O in this embodiment. As shown in FIGS. 10A and 10B, in this embodiment, each of the radially outwardly disposed electrical interconnects 106O respectively extends at least partly circumferentially around or along the radially outer periphery of the stator bars 102. The radially outwardly disposed electrical interconnects 106O include: some first type of radially outwardly disposed electrical interconnects that are each extending only circumferentially around or along a portion of the radially outer periphery of the stator bars 102 and some second type of radially outwardly disposed electrical interconnects that are each respectively extending circumferentially and axially around or along a portion of the radially outer periphery of the stator bars 102. The second type of radially outwardly disposed electrical interconnects each includes at least: a first circumferential portion that extends only circumferentially around or along a portion of the outer periphery of the stator bars 102 in one axial plane, a second circumferential portion that extends only circumferentially around or along a portion of the outer periphery of the stator bars 102 in another axial plane, and an axial-circumferential portion between the first and second circumferential portions. The axial-circumferential portion extends simultaneously axially and circumferentially around or along a portion of the outer periphery of the stator bars 102. Some of the second type of radially outwardly disposed electrical interconnects may include further circumferential portion(s) and further axial-circumferential portion(s). As shown in FIG. 10B, the resulting configuration is that: the first type of radially outwardly disposed electrical interconnects and the circumferential portions of the second type of radially outwardly disposed electrical interconnects are arranged on different parallel axial planes AP1, AP2, AP3, AP4, AP5 perpendicular to the axis X. The length of the first type of radially outwardly disposed electrical interconnects and/or the circumferential portions of the second type of radially outwardly disposed electrical interconnects may be different. The lengths of the axial-circumferential portions can be different. In this embodiment, some of the axial-circumferential portions are distributed on generally parallel paths (at an acute angle to axis X) in the side view of FIG. 10B.

Figure 11A:
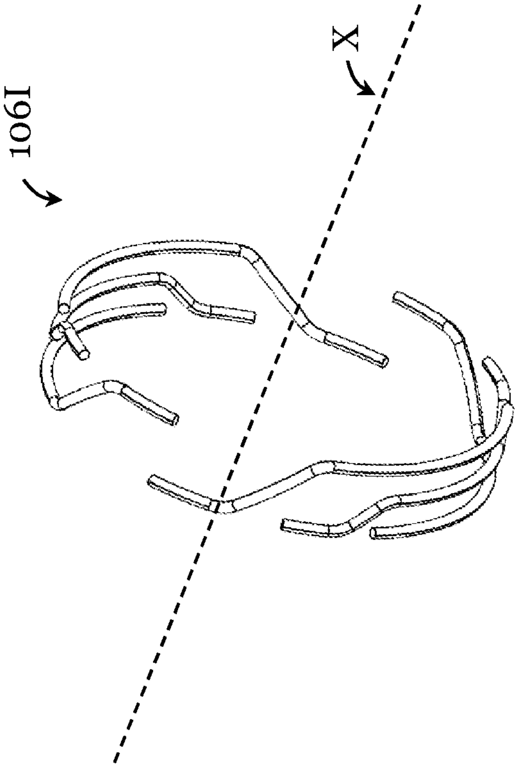
FIG. 11A is a perspective view of the radially inwardly disposed electrical interconnects of the stator of FIG. 1.
Figure 11B:
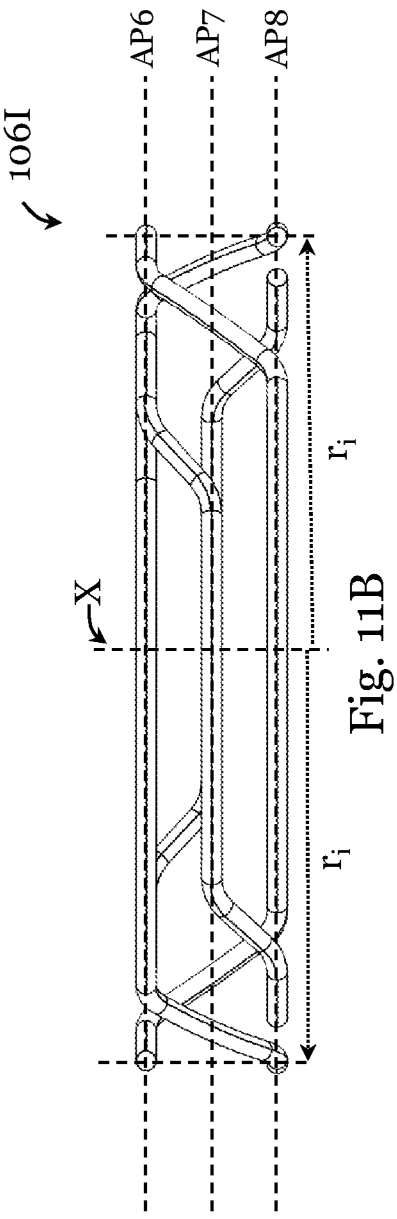
FIG. 11B is a side view of the radially inwardly disposed electrical interconnects of FIG. 11A.

FIGS. 11A and 11B illustrate the radially inwardly disposed electrical interconnects 106I in this embodiment. As shown in FIGS. 11A and 11B, in this embodiment, each of the radially inwardly disposed electrical interconnects 106I respectively extends at least partly circumferentially around or along the radially inner periphery of the stator bars 102. The radially inwardly disposed electrical interconnects 106I are each respectively extending circumferentially and axially around or along a portion of the radially inner periphery of the stator bars 102. The radially inwardly disposed electrical interconnects 106I each includes at least: a first circumferential portion that extends only circumferentially around or along a portion of the inner periphery of the stator bars 102 in one axial plane, a second circumferential portion that extends only circumferentially around or along a portion of the inner periphery of the stator bars 102 in another axial plane, and an axial-circumferential portion between the first and second circumferential portions. The axial-circumferential portion extends simultaneously axially and circumferentially around or along a portion of the inner periphery of the stator bars 102. Some of the second type of radially inwardly disposed electrical interconnects may include further circumferential portion(s) and further axial-circumferential portion(s). As shown in FIG. 11B, the resulting configuration is that the circumferential portions of the radially inwardly disposed electrical interconnects are arranged on different parallel axial planes AP, AP7, AP8 perpendicular to the axis X. The length of the circumferential portions of the radially inwardly disposed electrical interconnects may be different. The lengths of the axial-circumferential portions can be different. In this embodiment, some of the axial-circumferential portions are distributed on generally parallel paths (at an acute angle to axis X) in the side view of FIG. 11B.

Figure 12:
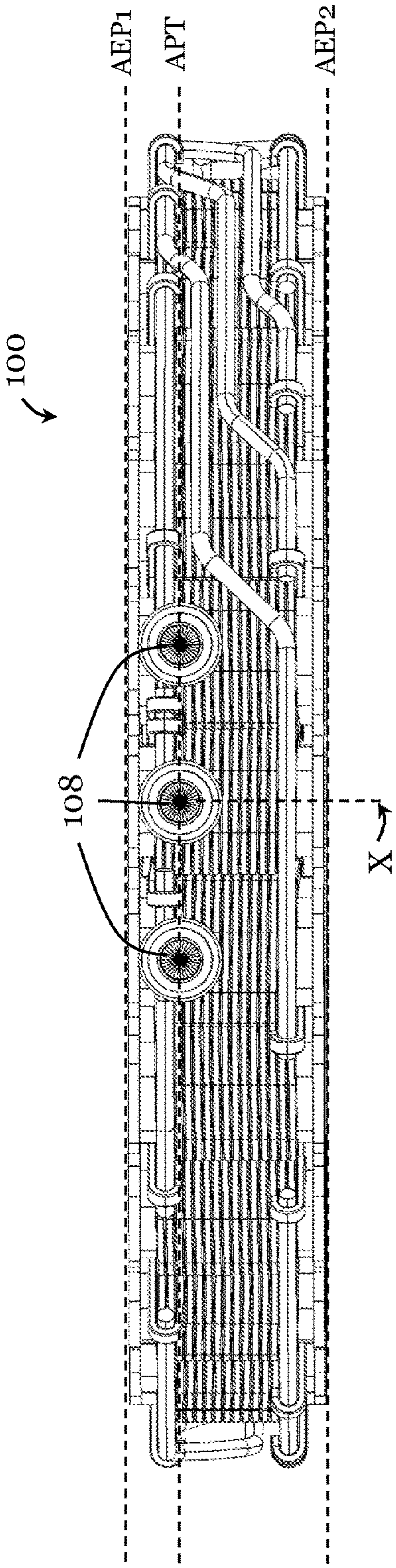
FIG. 12 is a side/top view of stator of FIG. 1.

Referring to FIGS. 1 and 12, in this embodiment, the stator 100 has two axial end faces arranged in two axial end planes AEP1, AEP2 generally perpendicular to the axis X. The axial end planes AEP1, AEP2 are generally parallel and are defined by the stator bars 102. The stator bars 102, the sets of windings 104, the electrical interconnects 106O, 106I, and the stator terminals 108 are all disposed between the two axial end planes AEP1, AEP2.

Figure 13:
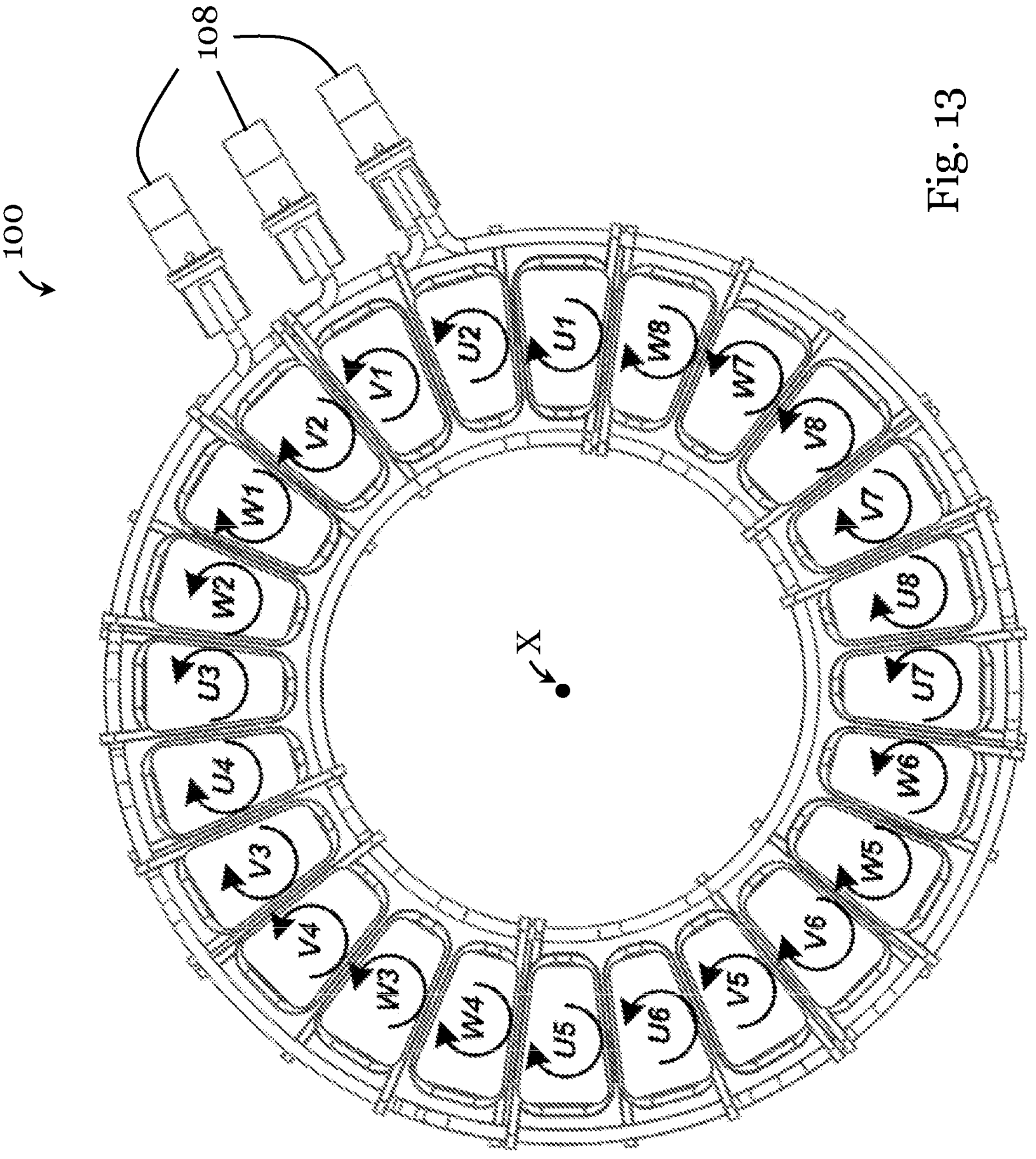
FIG. 13 is a schematic diagram illustrating the configuration of the stator of FIG. 1.

FIG. 13 shows the configuration of the stator 100, in particular the sense of winding of the different sets of windings 104 (clockwise or anti-clockwise) and the phase relationship. As shown in FIG. 13, in this embodiment, the sets of windings 104 are arranged such that each pair of sets of windings 104 (formed by adjacent sets of windings 104) have the same sense and adjacent pairs of the sets of windings 104 have opposite senses. That is, for 24 consecutive winding sets: winding sets #1, #2=clockwise; winding sets #3, #4=anti-clockwise; winding sets #5, #6=clockwise; winding sets #7, #8=anti-clockwise; etc. In this embodiment, the sets of windings are arranged in a three-phase arrangement and are arranged to electrically connect with a three-phase supply (UVW power supply) via the electrical interconnects 106O, 106I and the three stator terminals (UVW phase terminals) 108. Referring to FIG. 12, the three stator (phase) terminals 108 are disposed generally in the same axial plane APT, which is generally parallel to the two axial end planes AEP1, AEP2, and is offset from a mid-plane between the two axial end planes AEP1, AEP2.

While not specifically illustrated, in this embodiment, a stator housing may at least partly receive the stator bars 102, the sets of windings 104, and the electrical interconnects 106O, 106I. The stator housing may define or provide one or more openings through which the stator terminals 108 extend.

FIGS. 14-20 show a stator 200 for an axial flux machine in another embodiment of the invention. The stator 200 generally includes twenty-four stator bars 202 disposed generally radially around and circumferentially spaced about axis X, corresponding twenty-four sets of windings 204 each wound around a respective stator bar 202 and operable to generate (e.g., when energized) a respective magnetic field generally parallel to the axis X, and electrical interconnects 206 electrically connected with the twenty-four sets of windings 204. The axis X may correspond to a rotation axis of a rotor arranged at an axial end of the stator.

Figure 14:
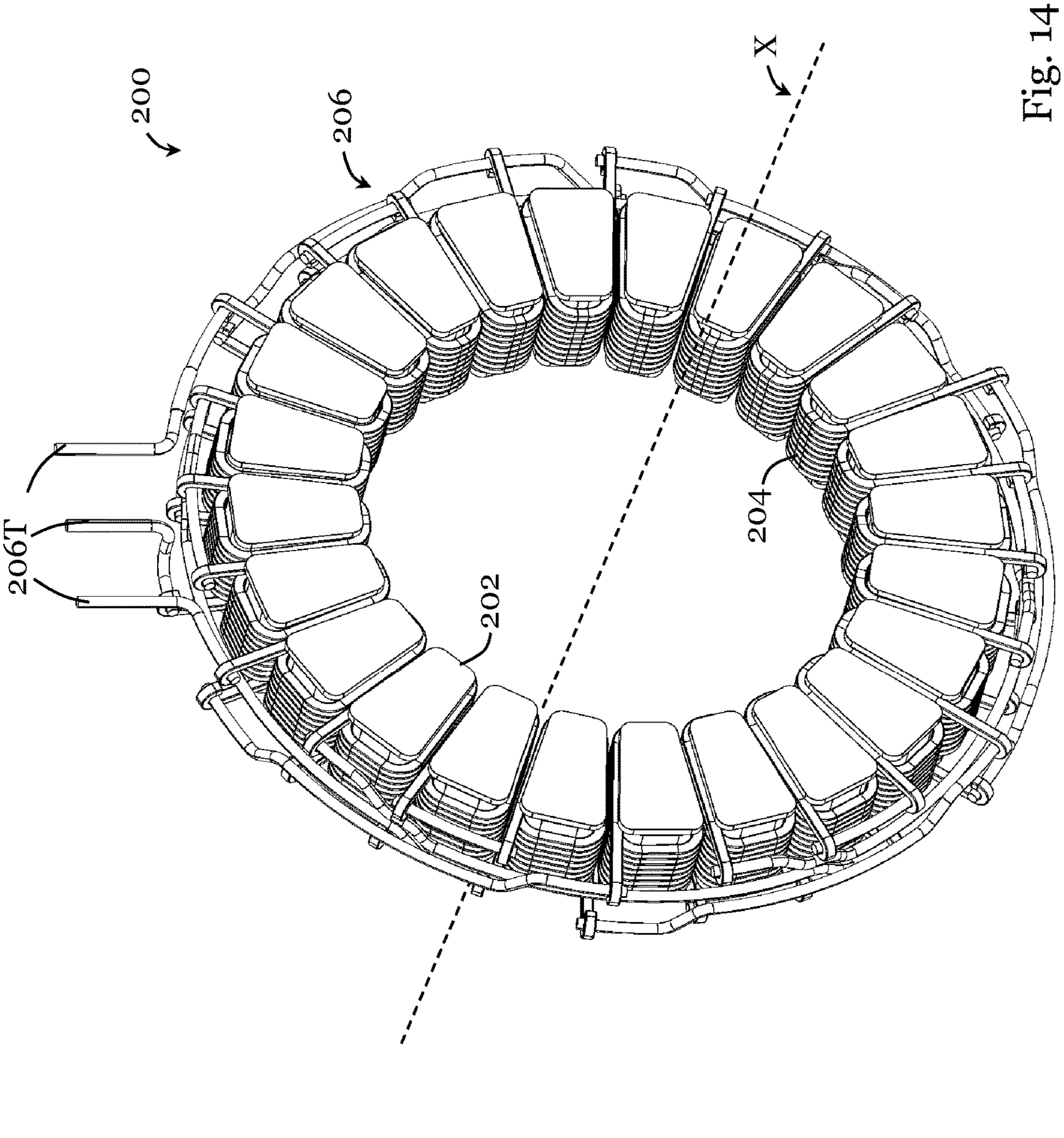
FIG. 14 is a perspective view of a stator in one embodiment of the invention.
Figure 15:
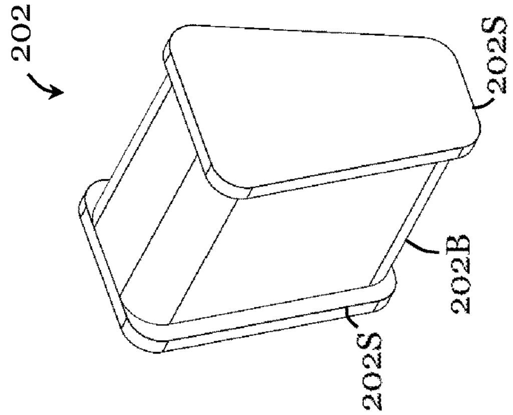
FIG. 15 is a perspective view of a stator bar of the stator of FIG. 14.

In this embodiment, the construction of the twenty-four stator bars 202 are generally the same. Referring to FIG. 14, each of the stator bar 202 generally extends axially in a direction generally parallel to axis X. Referring to FIG. 15, the stator bar 202 includes a bar portion 202B extending generally parallel to the axis and two shoe portions 202S at two axial ends of the bar portion 202B. The bar portion 202B enables winding of a corresponding set of windings 204 thereon whereas the shoe portions 202S confine the corresponding set of windings 204 on the bar portion 202B.

In this embodiment, the twenty-four sets of windings 204 are arranged in multiple different configurations, as illustrated in FIGS. 16A to 17B. Generally, each set of windings 204 is respectively formed by: a main winding portion formed by one or more coil loops and two end portions extending away from the main winding portion. The main winding portion and the two end portions may be integrally formed or provided by a continuous wire. Each set of windings 204 is wound substantially entirely on the bar portion 202B of the stator bar 202.

Figure 16B:
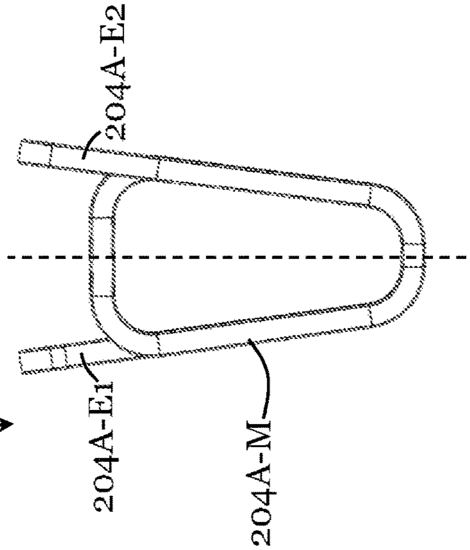
FIG. 16B is a front view of the set of windings of FIG. 16A.
Figure 16A:
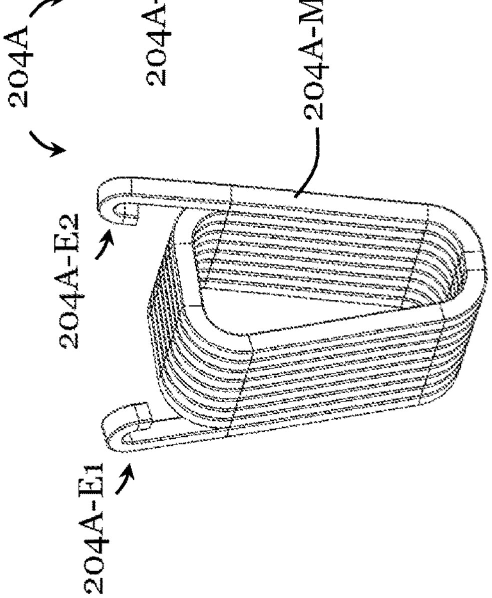
FIG. 16A is a perspective view of a set of windings of the stator of FIG. 14.

Referring to FIGS. 14, 16A, and 16B, in one configuration, the set of windings 204A includes a main winding portion 204A-M formed by multiple coil loops, one end portion 204A-E1 arranged near the rear axial end of the main winding portion 204A-M and disposed radially outwardly of the corresponding stator bar, and another end portion 204A-E2 arranged near the front axial end of the main winding portion 204A-M and disposed radially outwardly of the corresponding stator bar. Both end portions 204A-E1, 204A-E2 extend generally radially outwardly away from the main winding portion 204A-M. As shown in FIG. 16B, the two end portions 204A-E1, 204A-E2 are disposed on opposite sides (relative to the mid-plane defined by the main winding portion 204A-M, being generally parallel to the axis X and generally perpendicular to the center axial plane defined by the main winding portion 204A-M). The two end portions 204A-E1, 204A-E2 have generally the same extent of extension (length). As shown in FIGS. 14 and 16A, the end portion 204A-E1 includes a generally U-shaped hook portion engaged with (e.g., welded to, soldered to, etc.) one or more portions of the electrical interconnects 206 and the end portion 204A-E2 includes a generally U-shaped hook portion engaged with (e.g., welded to, soldered to, etc.) one or more portions of the electrical interconnects 206. The generally U-shaped hook portions each respectively extend inwardly towards the center axial plane (perpendicular to axis X) defined by the main winding portion 204A-M.

Figure 17B:
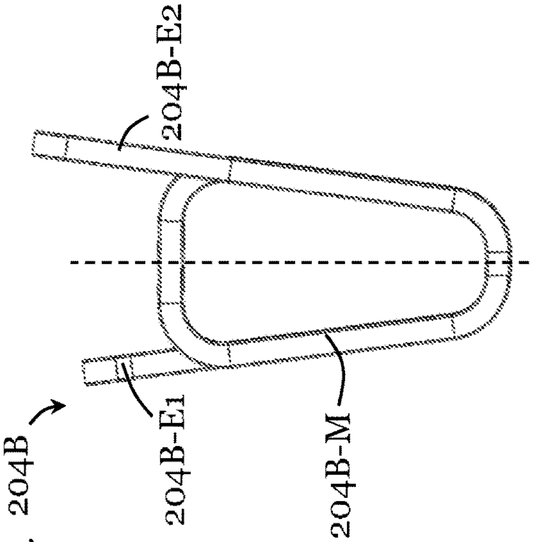
FIG. 17B is a front view of the set of windings of FIG. 17A.
Figure 17A:
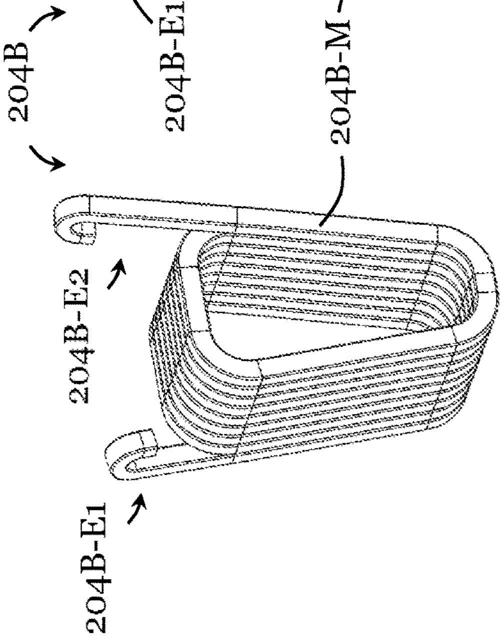
FIG. 17A is a perspective view of a set of windings of the stator of FIG. 14.

Referring to FIGS. 14, 17A, and 17B, in one configuration, the set of windings 204B includes a main winding portion 204B-M formed by multiple coil loops, one end portion 204B-E1 arranged near the rear axial end of the main winding portion 204B-M and disposed radially outwardly of the corresponding stator bar, and another end portion 204B-E2 arranged near the front axial end of the main winding portion 204B-M and disposed radially outwardly of the corresponding stator bar. Both end portions 204B-E1, 204B-E2 extend generally radially outwardly away from the main winding portion 204B-M. As shown in FIG. 17B, the two end portions 204B-E1, 204B-E2 are disposed on opposite sides (relative to the mid-plane defined by the main winding portion 204B-M, being generally parallel to the axis X and generally perpendicular to the center axial plane defined by the main winding portion 204B-M). The two end portions 204B-E1, 204B-E2 have generally the different extents of extension (lengths). As shown in FIGS. 14 and 17A, the end portion 204B-E1 includes a generally U-shaped hook portion engaged with (e.g., welded to, soldered to, etc.) one or more portions of the electrical interconnects 206 and the end portion 204B-E2 includes a generally U-shaped hook portion engaged with (e.g., welded to, soldered to, etc.) one or more portions of the electrical interconnects 206. The generally U-shaped hook portions each respectively extend inwardly towards the center axial plane (perpendicular to axis X) defined by the main winding portion 204B-M.

Figure 18B:
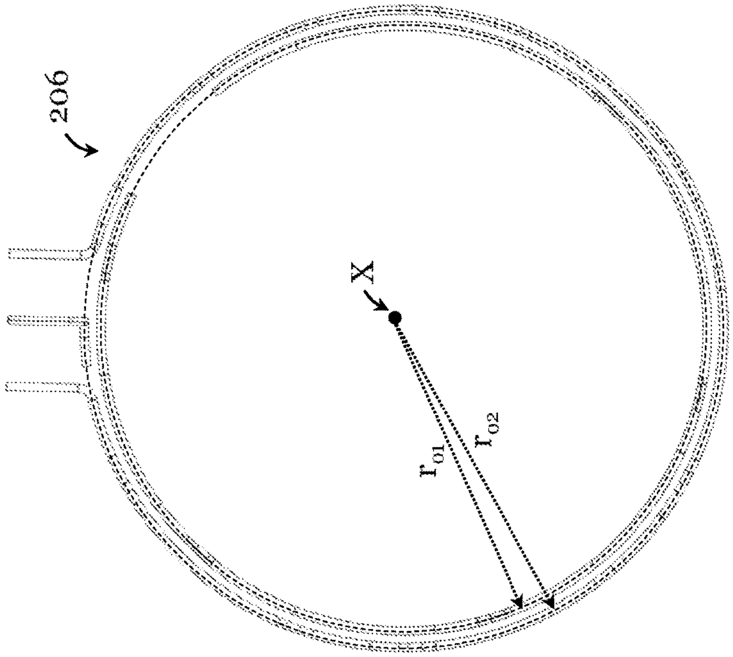
FIG. 18B is a front view of the electrical interconnects of FIG. 18A.
Figure 18A:
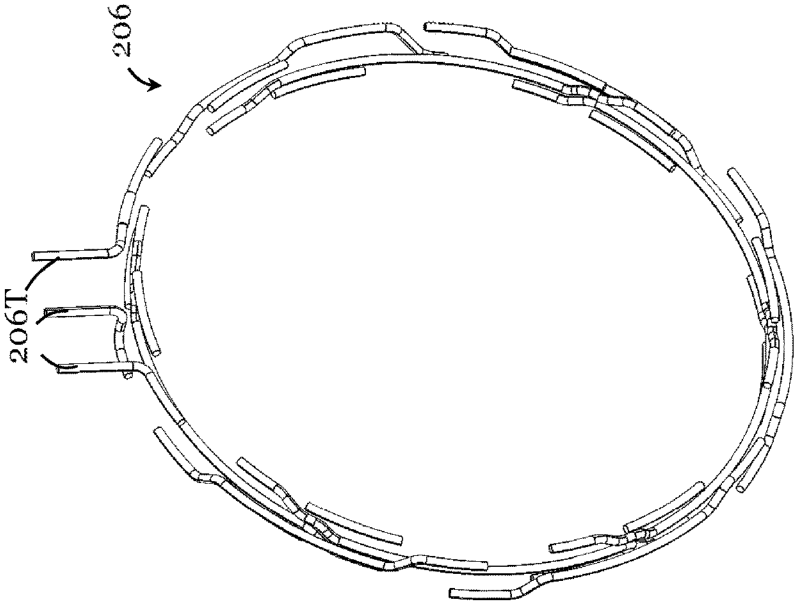
FIG. 18A is a perspective view of the electrical interconnects of the stator of FIG. 14.

FIGS. 18A to 18B illustrate the configuration of the electrical interconnects 206 in this embodiment. In this embodiment, the electrical interconnects 206 are all radially outwardly disposed electrical interconnects disposed radially outwardly of the stator bars 202 and the stator 200 lacks any radially inwardly disposed electrical interconnects disposed radially inwardly of the stator bars 202. Each of the radially outwardly disposed electrical interconnects 206 electrically connects two or more of the sets of windings 204 together, via the hook portions of the sets of windings 204. In this embodiment, the electrical interconnects 206 are provided by wires with a generally circular cross section.

In this embodiment, the radially outwardly disposed electrical interconnects 206 are collectively arranged circumferentially around or along the entire radially outer periphery of the stator bars 202 such that the radially outwardly disposed electrical interconnects 206, when all considered together, are arranged circumferentially around or along the entire radially outer periphery of the stator bars 202 but none of the radially outwardly disposed electrical interconnects 206 alone is arranged circumferentially around or along the entire radially outer periphery of the stator bars 202. In this embodiment, the electrical interconnects 206 are disposed such that: in front view (FIG. 18B), the radially outwardly disposed electrical interconnects 206 (e.g., except for the interconnect portions 206T) are substantially entirely distributed on two generally circular paths, which are generally concentric, have a common center generally corresponding to the location of the axis X, and have different radii $r_{o1}$ and $r_{o2}$.

Figure 18C:
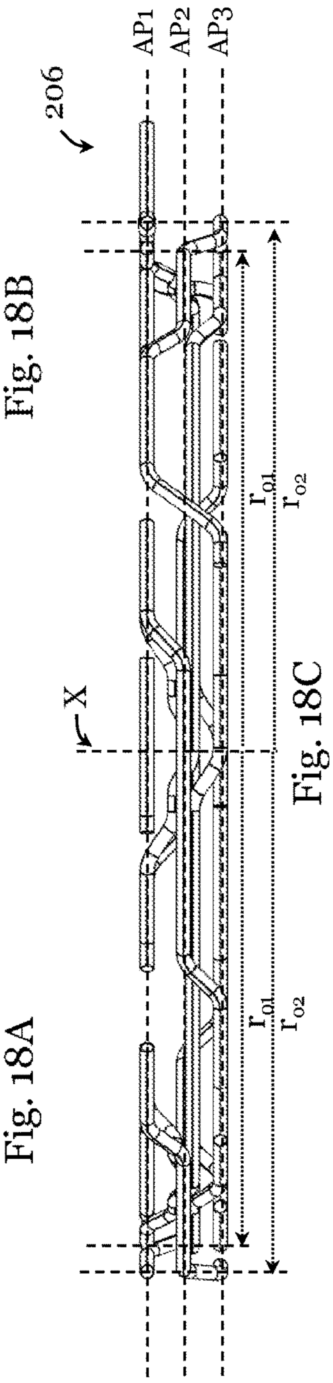
FIG. 18C is a side view of the electrical interconnects of FIG. 18A.

As shown in FIGS. 18A and 18C, in this embodiment, each of the radially outwardly disposed electrical interconnects 206 respectively extends at least partly circumferentially around or along the radially outer periphery of the stator bars 202. The radially outwardly disposed electrical interconnects 206 include: some first type of radially outwardly disposed electrical interconnects that are each extending only circumferentially around or along a portion of the radially outer periphery of the stator bars 202 and some second type of radially outwardly disposed electrical interconnects that are each respectively extending circumferentially and axially around or along a portion of the radially outer periphery of the stator bars 202. The second type of radially outwardly disposed electrical interconnects each includes at least: a first circumferential portion that extends only circumferentially around or along a portion of the outer periphery of the stator bars 202 in one axial plane, a second circumferential portion that extends only circumferentially around or along a portion of the outer periphery of the stator bars 202 in another axial plane, and an axial-circumferential portion between the first and second circumferential portions. The axial-circumferential portion extends simultaneously axially and circumferentially around or along a portion of the outer periphery of the stator bars 202. Some of the second type of radially outwardly disposed electrical interconnects may include further circumferential portion(s) and further axial-circumferential portion(s). As shown in FIG. 18C, the resulting configuration is that: the first type of radially outwardly disposed electrical interconnects and the circumferential portions of the second type of radially outwardly disposed electrical interconnects are arranged on different parallel axial planes AP1, AP2, AP3 perpendicular to the axis X. The length of the first type of radially outwardly disposed electrical interconnects and/or the circumferential portions of the second type of radially outwardly disposed electrical interconnects may be different. The lengths of the axial-circumferential portions can be different. In this embodiment, some of the axial-circumferential portions are distributed on generally parallel paths (at an acute angle to axis X) in the side view of FIG. 18C.

Figure 19:
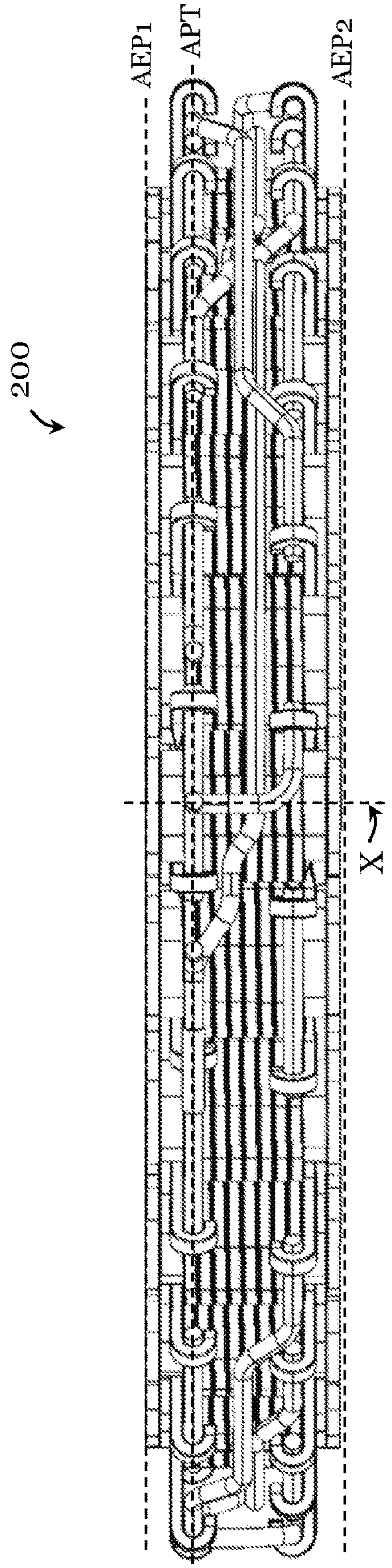
FIG. 19 is a side/top view of stator of FIG. 14.

Referring to FIGS. 14 and 19, in this embodiment, the stator 200 has two axial end faces arranged in two axial end planes AEP1, AEP2 generally perpendicular to the axis X. The axial end planes AEP1, AEP2 are generally parallel and are defined by the stator bars 202. The stator bars 202, the sets of windings 204, and the electrical interconnects 206, and the stator terminals are all disposed between the two axial end planes AEP1, AEP2. Referring to FIG. 19, the three interconnect portions 206T are disposed generally in the same axial plane APT, which is generally parallel to the two axial end planes AEP1, AEP2, and is offset from a mid-plane between the two axial end planes AEP1, AEP2. Although not illustrated, the stator 200 may include three stator terminals (like the ones in the embodiment of FIG. 1) coupled with the interconnect portions 206T for connection with a three-phase supply (UVW power supply).

Figure 20B:
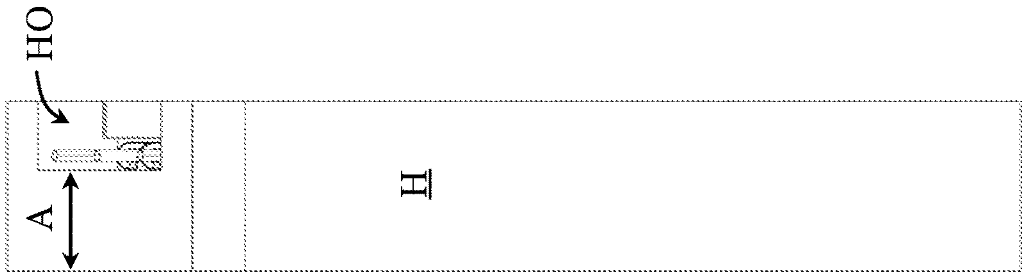
FIG. 20B is a side view of the stator of FIG. 14 arranged in the stator housing (partly shown), as shown in FIG. 20A.
Figure 20A:
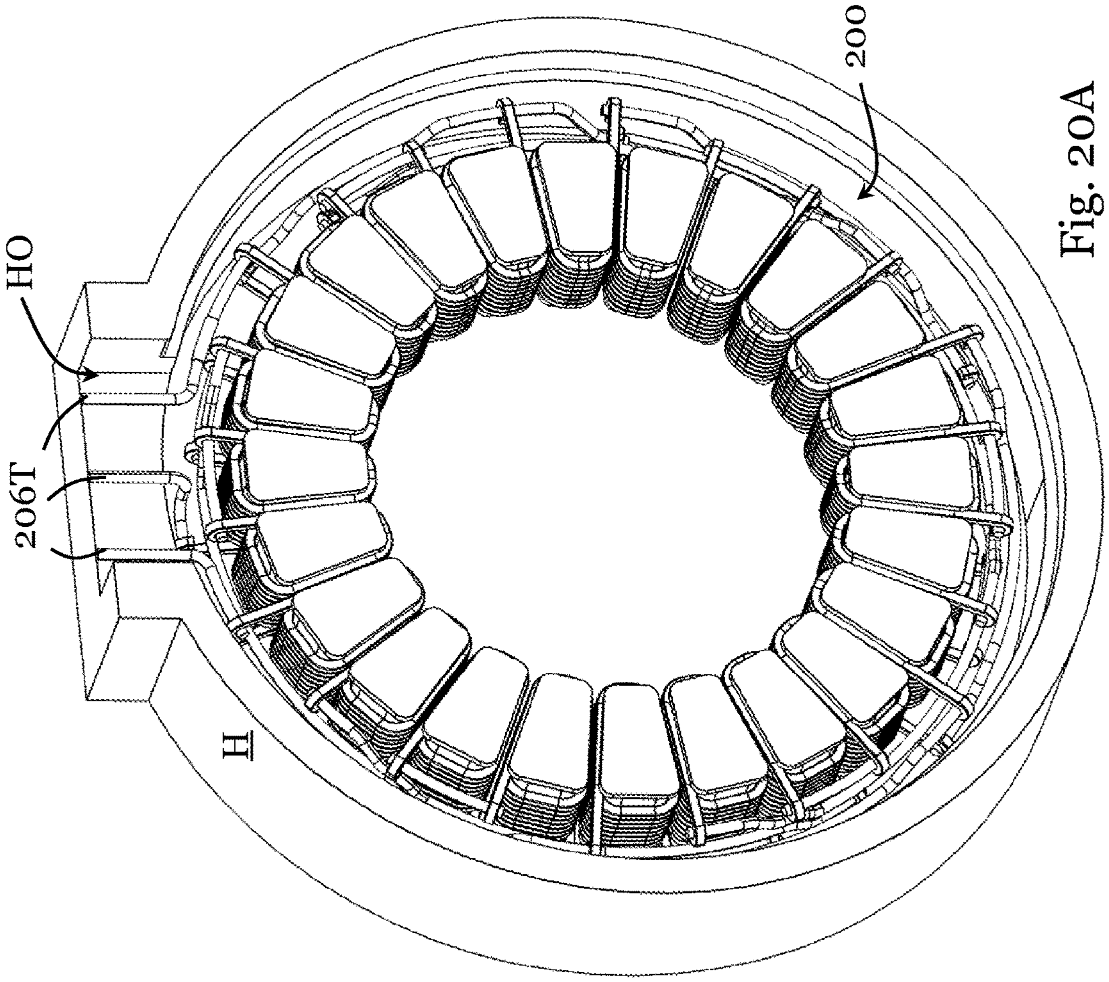
FIG. 20A is a schematic diagram of the stator of FIG. 14 arranged in a stator housing (partly shown)
Figure 21:
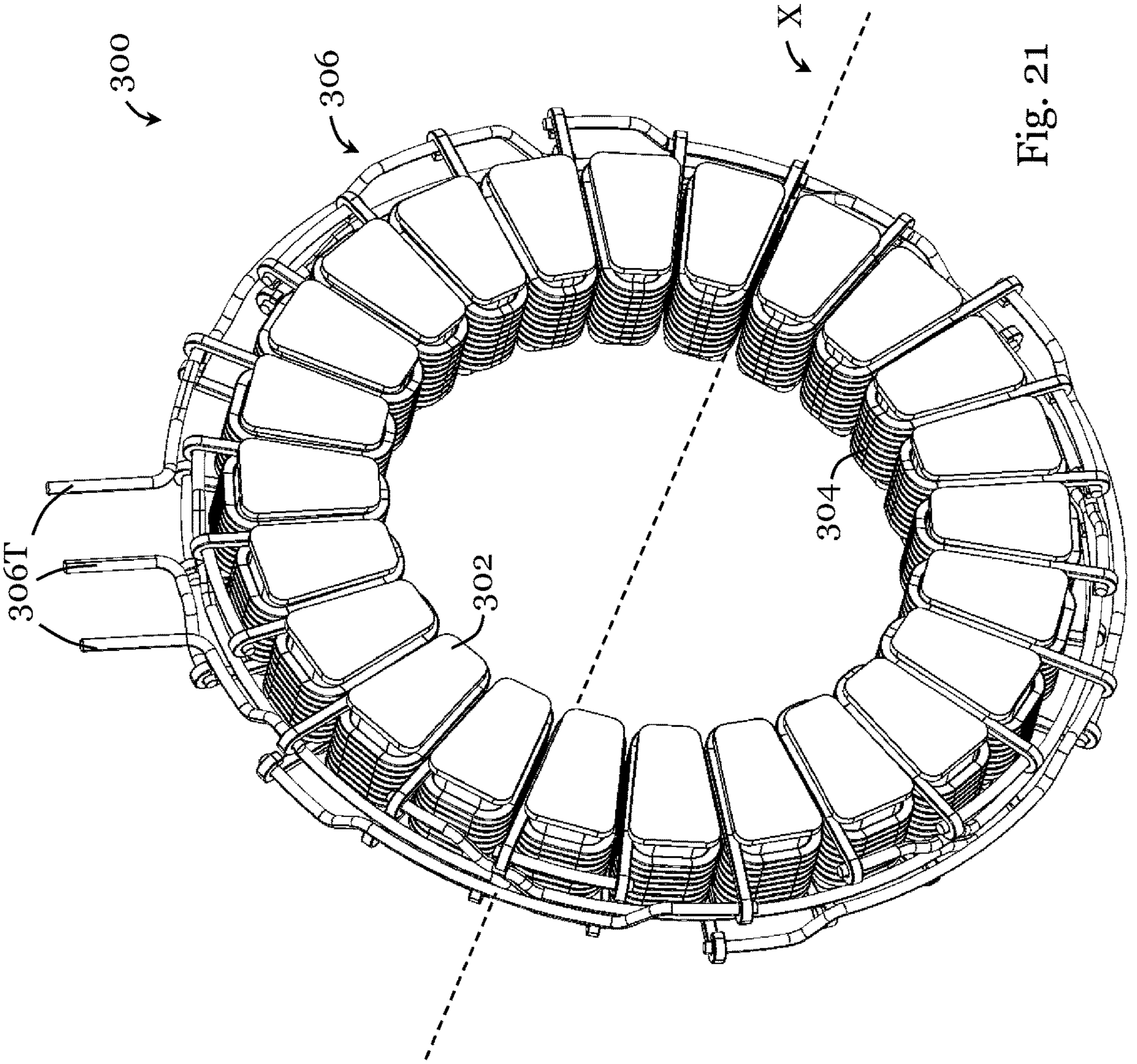
FIG. 21 is a perspective view of a stator in one embodiment of the invention.
Figure 22:
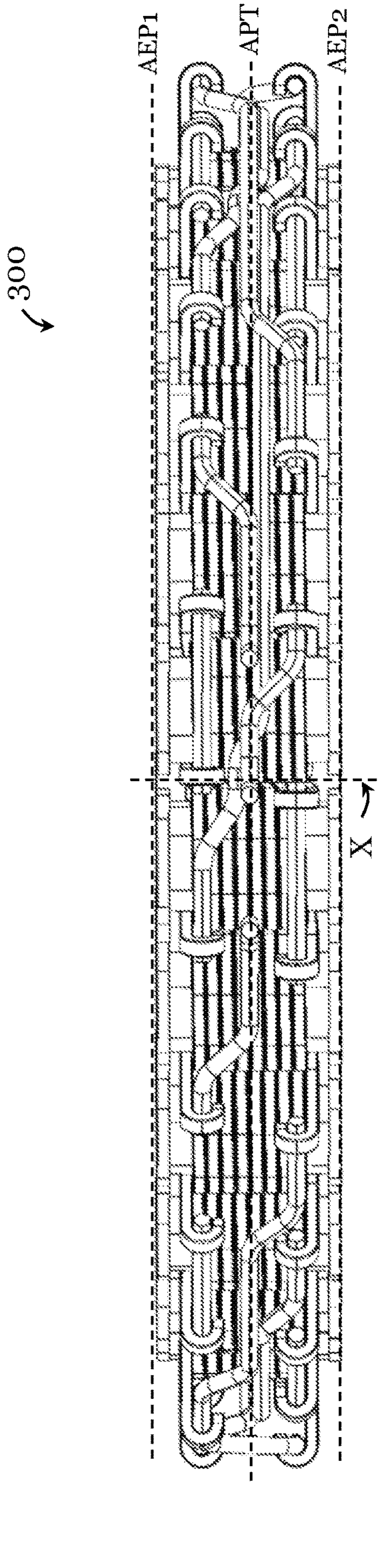
FIG. 22 is a side/top view of stator of FIG. 21.

FIGS. 20A and 20B show the stator 200 arranged in a stator housing H with an opening HO through which the interconnect portions 206T extend. The stator housing H at least partly receives stator bars 202, the sets of windings 204, and the electrical interconnects 206. In this embodiment, the wall of the stator housing H that defines the opening HO has an axial length A, which is more than half of the axial thickness of the stator housing H so can provide improved mechanical strength (compared with a wall with shorter axial length A, e.g., when the interconnect portions 206T are not offset from the mid-plane between the two axial end planes AEP1, AEP2). In one example, the stator housing H may be integrally formed using metal such as aluminium.

FIGS. 21-23B show a stator 300 for an axial flux machine in yet another embodiment of the invention. Like the stator 200, the stator 300 also generally includes twenty-four stator bars 302 disposed generally radially around and circumferentially spaced about axis X, corresponding twenty-four sets of windings 304 each wound around a respective stator bar 302 and operable to generate (e.g., when energized) a respective magnetic field generally parallel to the axis X, and electrical interconnects 306 (including interconnect portions 306T) electrically connected with the twenty-four sets of windings 304. The design of the stator 300 is generally the same as that of the stator 200 in FIGS. 14-20 so for brevity generally identical details are not repeated. The main difference between the stator 300 and the stator 200 is that in the stator 300, the interconnect portions 306T (hence the phase terminals) are disposed generally in the same axial plane APT, which is generally parallel to the two axial end planes AEP1, AEP2, and corresponds to a mid-plane between the two axial end planes AEP1, AEP2 (and the electrical interconnects 306 are correspondingly modified).

Figure 23B:
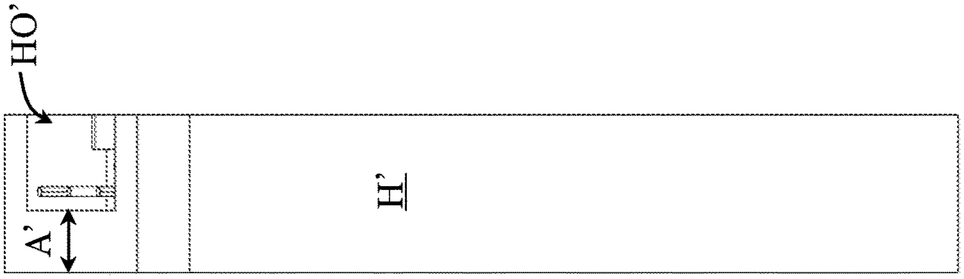
FIG. 23B is a side view of the stator of FIG. 21 arranged in the stator housing (partly shown), as shown in FIG. 23A.
Figure 23A:
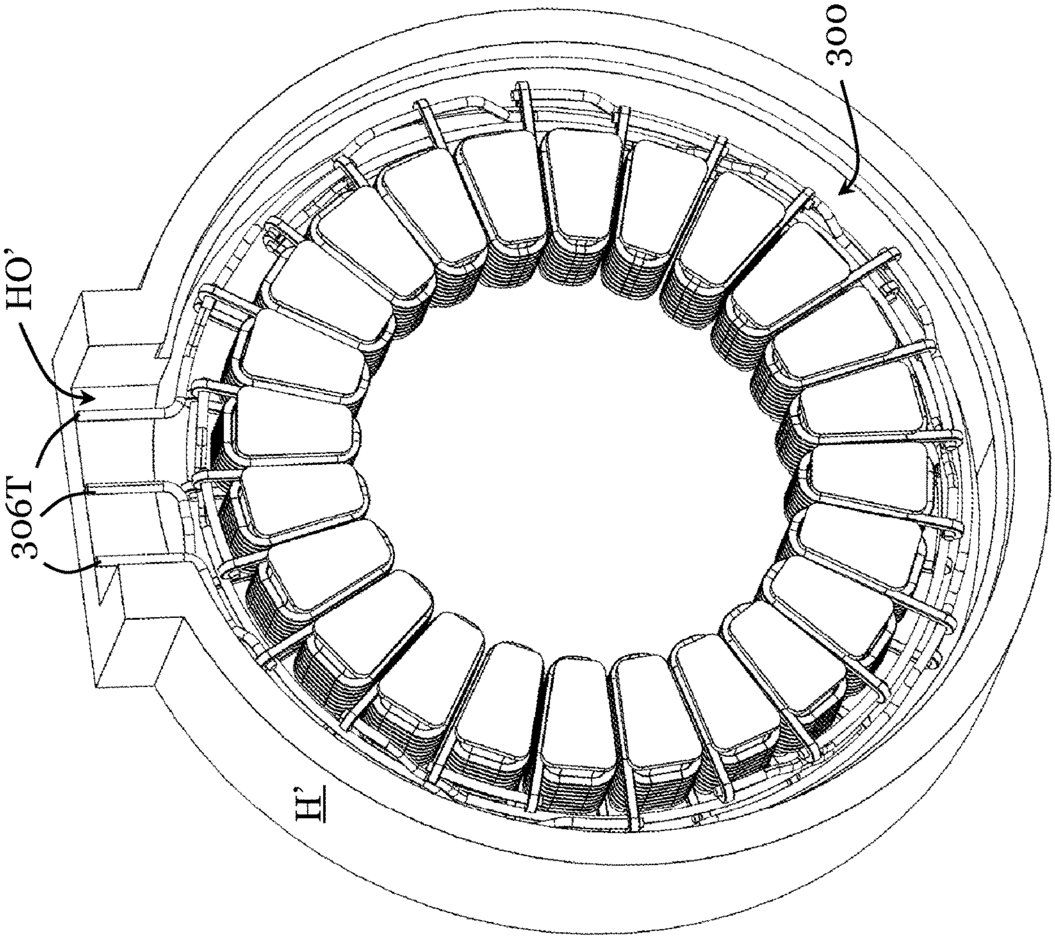
FIG. 23A is a schematic diagram of the stator of FIG. 21 arranged in a stator housing (partly shown)

FIGS. 23A and 23B show the stator 300 arranged in a stator housing H' with an opening HO' through which the interconnect portions 306T extend. The stator housing H' at least partly receives stator bars 302, the sets of windings 304, and the electrical interconnects 306. In this embodiment, the wall of the stator housing H' that defines the opening HO' has an axial length A', which is less than half of the axial thickness of the stator housing H so have reduced mechanical strength (compared with a wall with longer axial length, such as the axial length A in FIG. 20B). In one example, the stator housing H' may be integrally formed using metal such as aluminium.

FIGS. 24-28 show a stator 400 for an axial flux machine in one embodiment of the invention. The stator 400 generally includes eighteen sets of windings 404 disposed generally radially around and circumferentially spaced about axis X and operable to generate (e.g., when energized) a respective magnetic field generally parallel to the axis X, and electrical interconnects 406 electrically connected with the twenty-four sets of windings 404. The windings 404 are wound on stator bars (not shown), like the embodiments of FIGS. 1 to 23B. The axis X may correspond to a rotation axis of a rotor arranged at an axial end of the stator. The stator 400 also includes three stator terminals 408 integrally formed with the electrical interconnects 406.

Figure 24:
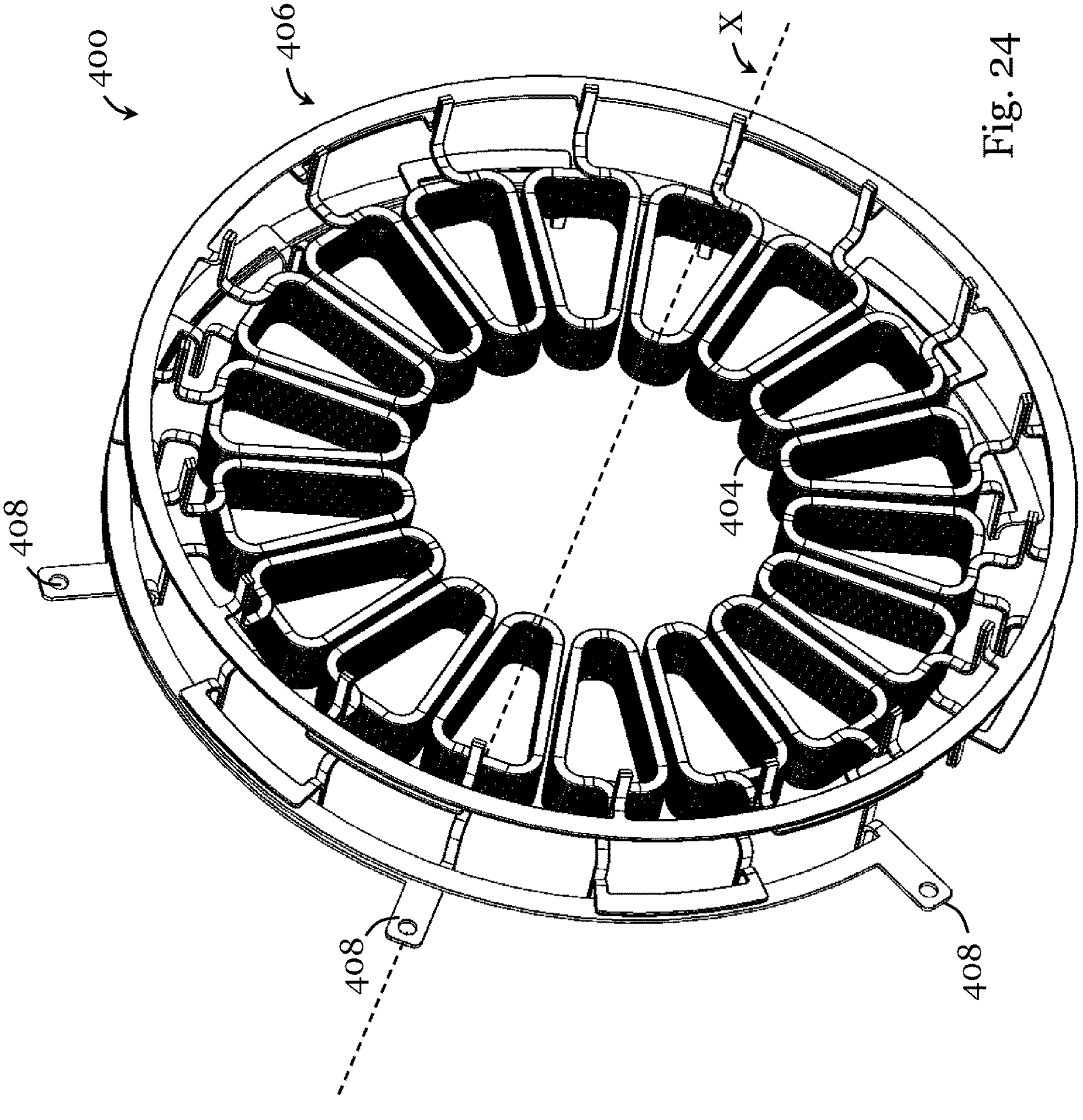
FIG. 24 is a perspective view of a stator in one embodiment of the invention (stator bars not shown)
Figures 25A, 25B:
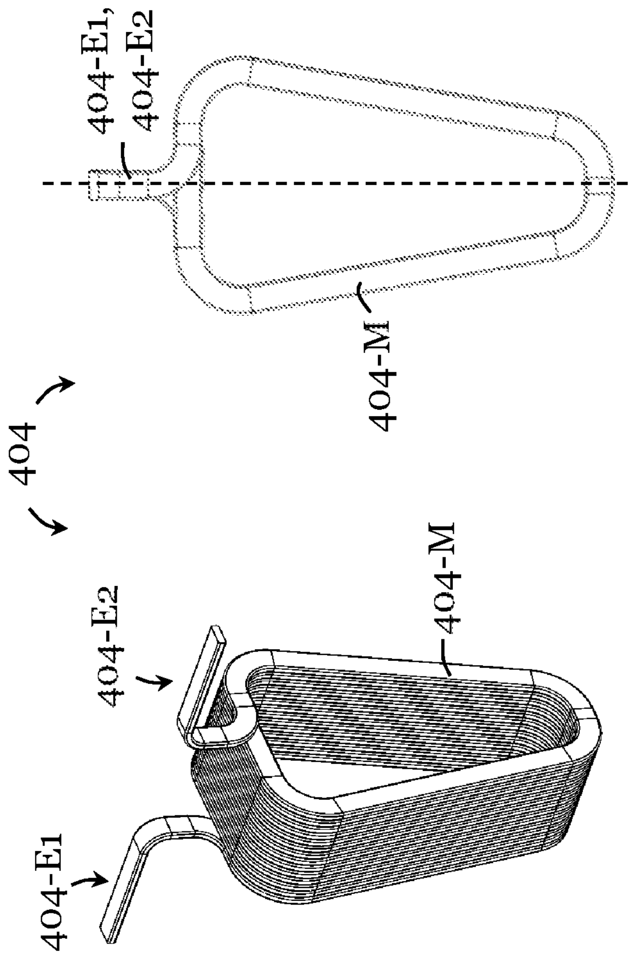
FIG. 25A is a perspective view of a set of windings of the stator of FIG. 24.
FIG. 25B is a front view of the set of windings of FIG. 25A.

In this embodiment, the eighteen sets of windings 404 are arranged in the same configuration, as illustrated in FIGS. 25A to 25B. Generally, each set of windings 404 is respectively formed by: a main winding portion formed by one or more coil loops and two end portions extending generally away from the main winding portion. The main winding portion and the two end portions may be integrally formed or provided by a continuous wire. Each set of windings 404 may be wound substantially entirely on a stator bar. Referring to FIGS. 24, 25A, and 25B, in this embodiment, the set of windings 404 includes a main winding portion 404-M formed by multiple coil loops, one end portion 404-E1 arranged near the rear axial end of the main winding portion 404-M, and another end portion 404-E2 arranged near the front axial end of the main winding portion 404-M. Both end portions 404-E1, 404-E2 extend at least partly radially outwardly away from the main winding portion 404-M. As shown in FIG. 25B, the two end portions 404-E1, 404-E2 are disposed on a mid-plane defined by the main winding portion 404-M, which is generally parallel to the axis X and generally perpendicular to the center axial plane defined by the main winding portion 404-M. The two end portions 404-E1, 404-E2 have generally the same extent of extension (length). As shown in FIGS. 24 and 25A, the end portion 404-E1 includes a generally L-shaped hook portion engaged with (e.g., welded to, soldered to, etc.) one or more portions of the electrical interconnects 406 and the end portion 404-E2 includes a generally L-shaped hook portion engaged with (e.g., welded to, soldered to, etc.) one or more portions of the electrical interconnects 406. The generally L-shaped hook portions each respectively include a first portion that extends generally outwardly with respect to the axis X, and a second portion extending generally axially (parallel to the axis X) away from the center axial plane defined by the main winding portion 404-M. The second portion of each of the generally L-shaped hook portions may be engaged with (e.g., welded to, soldered to, etc.) one or more portions of the electrical interconnect 406. The arrangement of the L-shaped hook portions facilitates making of the stator, in particular alignment and/or welding of the windings. The alignment and/or welding process (e.g., laser welding, resistance welding, etc.) can be more easily automated.

Figure 26C:
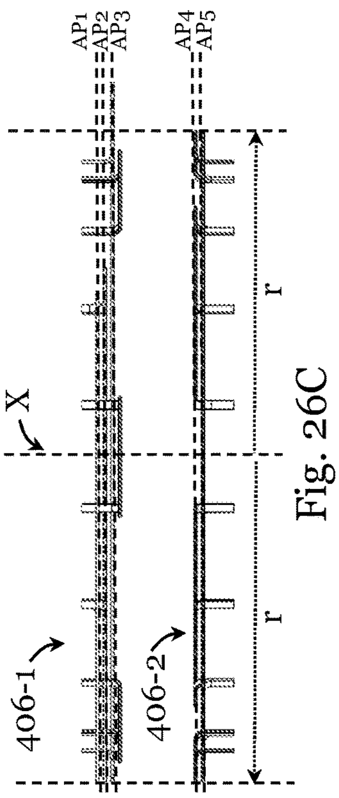
FIG. 26C is a side view of the electrical interconnects of FIG. 26A.
Figure 26A:
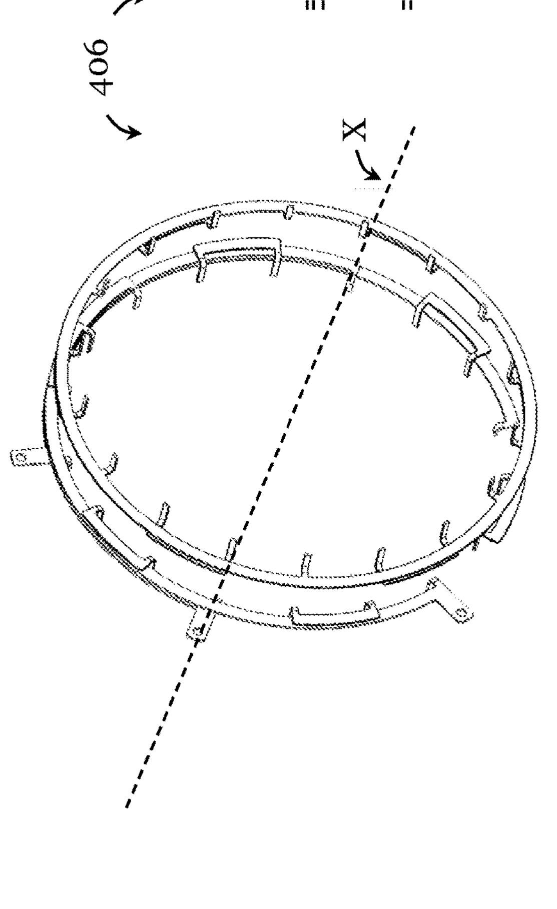
FIG. 26A is a perspective view of the electrical interconnects of the stator of FIG. 24.
Figure 26B:
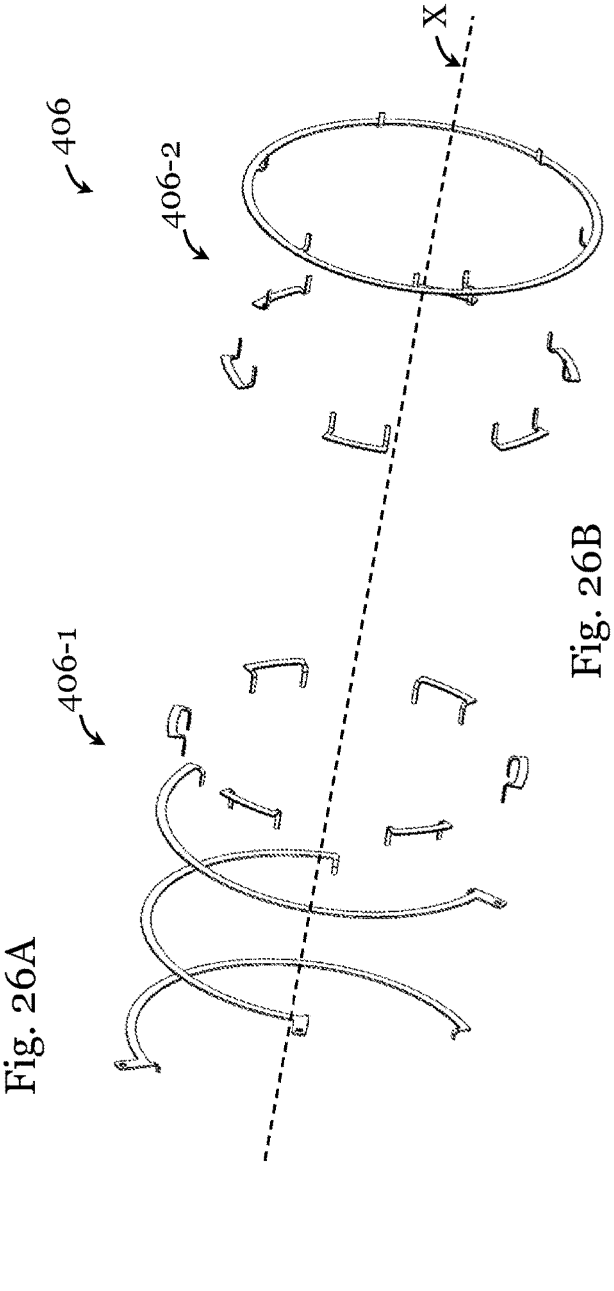
FIG. 26B is an exploded view of the electrical interconnects of FIG. 26A.

FIGS. 26A to 26C illustrate the configuration of the electrical interconnects 406 in this embodiment. In this embodiment, the electrical interconnects include radially outwardly disposed electrical interconnects 406 disposed radially outwardly of the sets of windings 404 and the stator 400 lacks any radially inwardly disposed electrical interconnects disposed radially inwardly of the sets of windings 404. Each of the radially outwardly disposed electrical interconnects 406 electrically connects two or more of the sets of windings 404 together, via the hook portions of the sets of windings 104. In this embodiment, the electrical interconnects 406 are provided by wires with a generally rectangular, flat cross section.

Referring to FIGS. 26A and 26B, in this embodiment, the radially outwardly disposed electrical interconnects 406 are collectively arranged circumferentially around or along the entire radially outer periphery of sets of windings 404 such that the radially outwardly disposed electrical interconnects 406, when all considered together, are arranged circumferentially around or along the entire radially outer periphery of the sets of windings 404. In this embodiment one of the radially outwardly disposed electrical interconnects 406 alone is arranged circumferentially around or along the entire radially outer periphery of the sets of windings 404. In this embodiment, the electrical interconnects 406 are disposed such that: in front view (not shown), the radially outwardly disposed electrical interconnects 406 (e.g., except for the portions associated with the stator terminals 408) are substantially entirely distributed on a single generally circular path that has a center generally corresponding to the location of the axis X.

Figure 27:
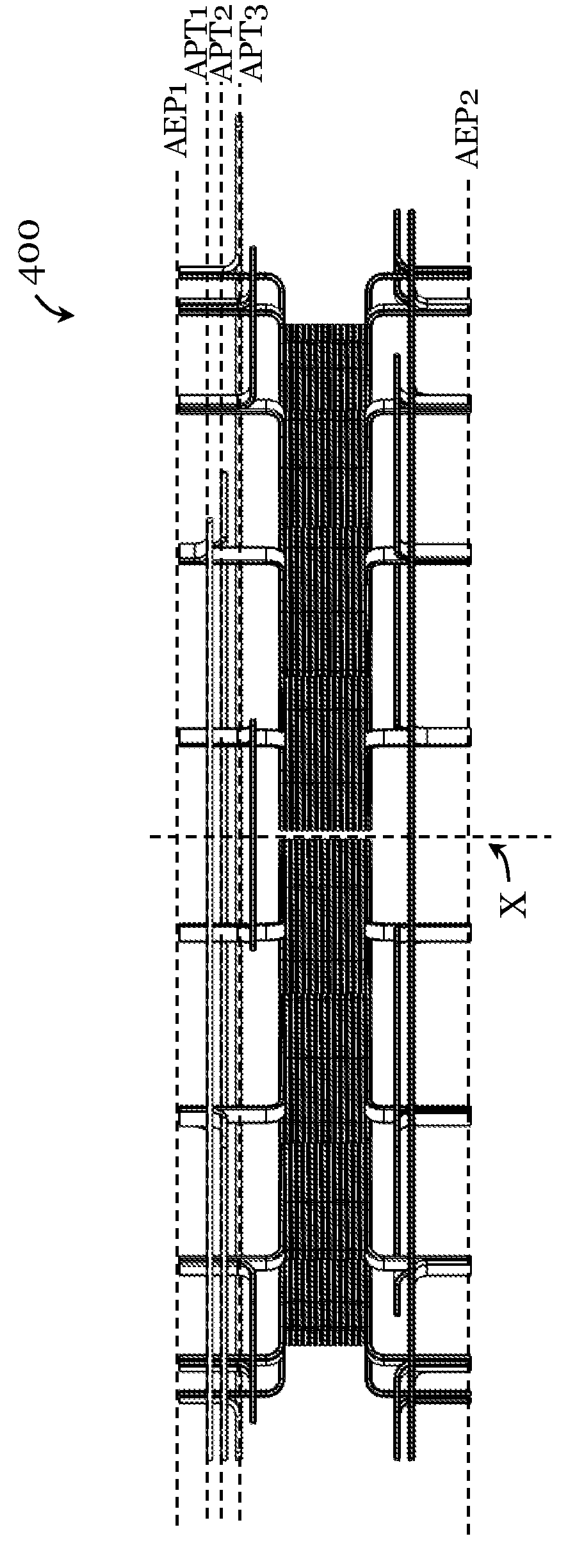
FIG. 27 is a side view of the stator of FIG. 24.

As shown in FIGS. 26A to 26C, in this embodiment, the radially outwardly disposed electrical interconnects 406 includes two sets of radially outwardly disposed electrical interconnects 406-1, 406-2. The first set of radially outwardly disposed electrical interconnects 406-1 include: three first type of radially outwardly disposed electrical interconnects that are each extending only circumferentially around or along a portion of the radially outer periphery of sets of windings 404 and six second type of radially outwardly disposed electrical interconnects that are each respectively extending circumferentially and axially around or along a portion of the radially outer periphery of the sets of windings 404. The second type of radially outwardly disposed electrical interconnects each includes at least: a circumferential portion that extends only circumferentially around or along a portion of the outer periphery of sets of windings 404 in one axial plane, and two axial portions connected at two ends of the circumferential portion and extends only axially (in the same axial direction) around or along a portion of the outer periphery of sets of windings 404. The three first type of radially outwardly disposed electrical interconnects are each integrally formed with a stator terminal 408. The three first type of radially outwardly disposed electrical interconnects and the six second type of radially outwardly disposed electrical interconnects are coupled together. The six second type of radially outwardly disposed electrical interconnects are angularly distributed generally equally. The axial portions of the radially outwardly disposed electrical interconnects 406-1 are for engaging and electrically connecting with the second portions of the generally L-shaped hook portion of the sets of windings 404. The second set of radially outwardly disposed electrical interconnects 406-2 include: one first type of radially outwardly disposed electrical interconnects that extend only circumferentially around or along the entirety of the radially outer periphery of sets of windings 404 and six second type of radially outwardly disposed electrical interconnects that are each respectively extending circumferentially and axially around or along a portion of the radially outer periphery of the sets of windings 404. The second type of radially outwardly disposed electrical interconnects each includes at least: a circumferential portion that extends only circumferentially around or along a portion of the outer periphery of sets of windings 404 in one axial plane, and two axial portions connected at two ends of the circumferential portion and extends only axially (in the same axial direction) around or along a portion of the outer periphery of sets of windings 404. The axial portions of the radially outwardly disposed electrical interconnects 406-2 are for engaging and electrically connecting with the second portions of the generally L-shaped hook portion of the sets of windings 404. The axial portions of the radially outwardly disposed electrical interconnects 406-1 and the axial portions of the radially outwardly disposed electrical interconnects 406-2 extend in opposite axial directions. The first type of radially outwardly disposed electrical interconnects and the six second type of radially outwardly disposed electrical interconnects are coupled together. The six second type of radially outwardly disposed electrical interconnects of the radially outwardly disposed electrical interconnects 406-1 are angularly distributed generally equally, and generally angularly aligned with the six second type of radially outwardly disposed electrical interconnects of the radially outwardly disposed electrical interconnects 406-2. As shown in FIGS. 26C and 27, the resulting configuration is that: the circumferential portions of the radially outwardly disposed electrical interconnects 406-1, 406-2 are arranged on different parallel axial planes AP1, AP2, AP3, AP4, AP5 perpendicular to the axis X, and the axial portions of the radially outwardly disposed electrical interconnects 406-1, 406-2 are arranged generally perpendicular to the axial planes AP1, AP2, AP3, AP4, AP5.

Referring to FIGS. 24 and 27, in this embodiment, the stator 400 has two axial end faces arranged in two axial end planes AEP1, AEP2 generally perpendicular to the axis X. The axial end planes AEP1, AEP2 are generally parallel and are defined by the electrical interconnects 406 (in particular the axially extending portions). The sets of windings 404, and the electrical interconnects 406, and the stator terminals 408 are all disposed between the two axial end planes AEP1, AEP2. Referring to FIG. 27, the three stator (phase) terminals 408 are disposed generally in the three parallel axial planes APT1, APT2, APT3, which are generally parallel to the two axial end planes AEP1, AEP2, and are offset from a mid-plane between the two axial end planes AEP1, AEP2.

Figure 28:
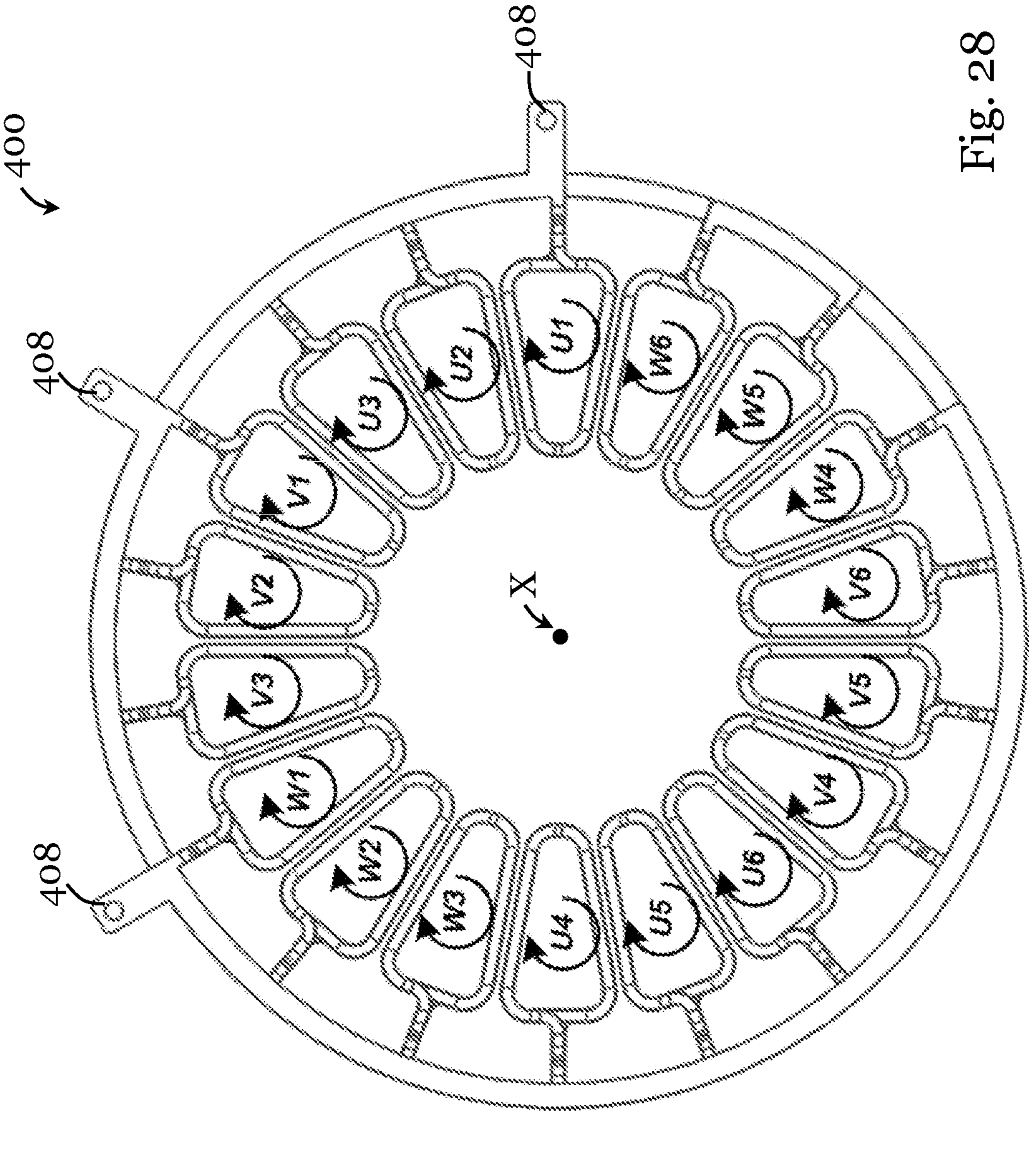
FIG. 28 is a schematic diagram illustrating the configuration of the stator of FIG. 24.

FIG. 28 shows the configuration of the stator 400, in particular the sense of winding of the different sets of windings 404 and the phase relationship. As shown in FIG. 28, in this embodiment, the sets of windings 404 are arranged such that all sets of windings 404 have the same sense (clockwise). In this embodiment, the sets of windings 404 are arranged in a three-phase arrangement and are arranged to electrically connect with a three-phase supply (UVW power supply) via the electrical interconnects 406 and the three stator terminals (UVW phase terminals) 408 integrally formed with the electrical interconnects 406.

While not specifically illustrated, in this embodiment, the stator also includes stator bars, similar to the earlier embodiments in FIGS. 1 to 23B. While not specifically illustrated, in this embodiment a stator housing may at least partly receive the sets of windings 404 and the electrical interconnects 406. The stator housing may define or provide one or more openings through which the stator terminals 408 extend.

Figure 29:
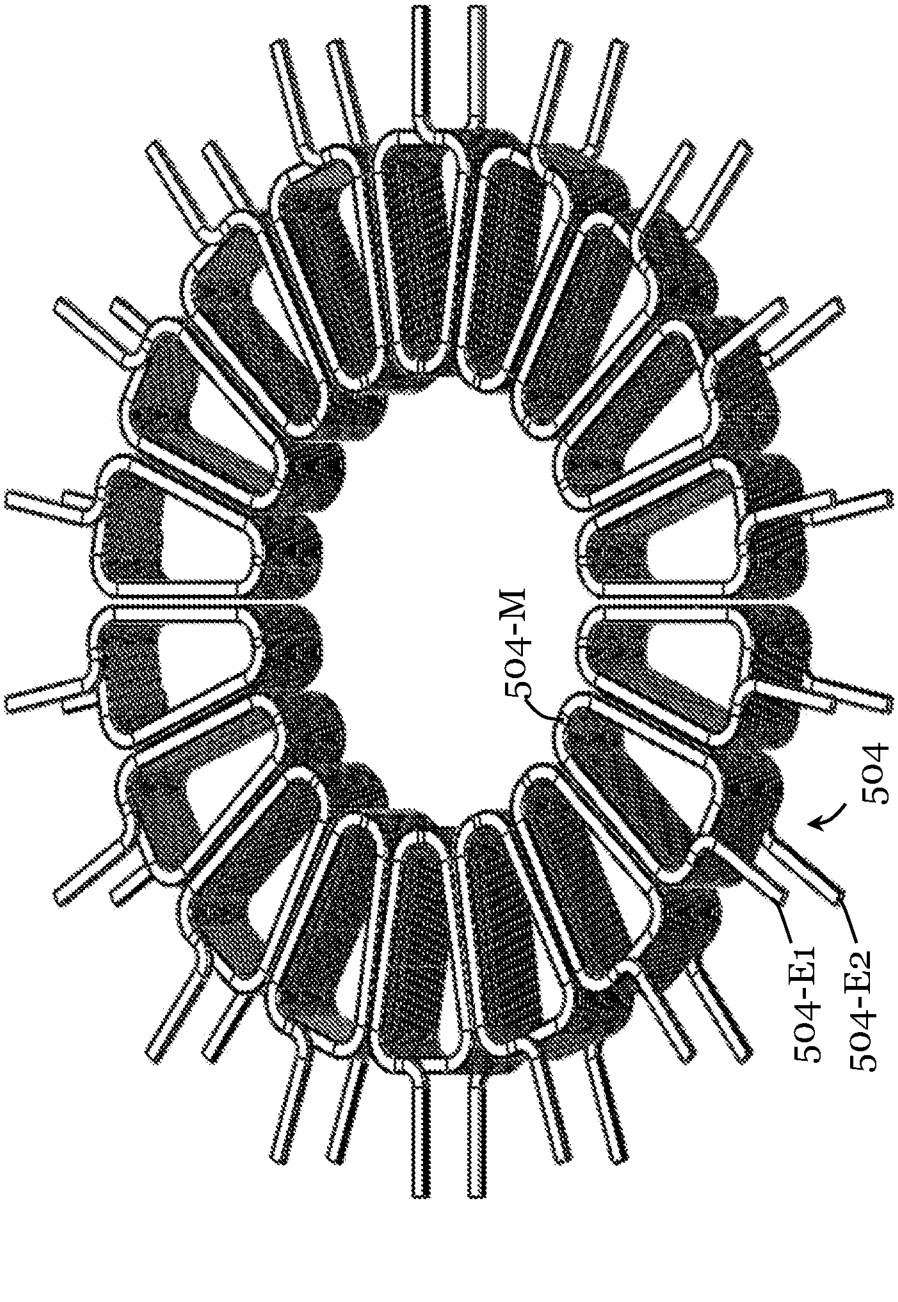
FIG. 29 is a schematic diagram illustrating a winding arrangement for a stator in one embodiment of the invention (stator bars and electrical interconnects not shown)

FIG. 29 illustrates a winding arrangement for a stator in one embodiment of the invention. The winding arrangement can be considered as a variant of the winding arrangement in the stator 400 of FIGS. 24-28. As shown in FIG. 29, the winding arrangement includes eighteen sets of windings 504 arranged in the same configuration. Generally, each set of windings 504 is respectively formed by: a main winding portion formed by one or more coil loops and two end portions extending generally away from the main winding portion. The main winding portion and the two end portions may be integrally formed or provided by a continuous wire. Each set of windings 504 may be wound substantially entirely on a stator bar. Referring to FIG. 29, in this embodiment, the set of windings 504 includes a main winding portion 504A-M formed by multiple coil loops, one end portion 504-E1 arranged near the rear axial end of the main winding portion 504A-M, and another end portion 504-E2 arranged near the front axial end of the main winding portion 504A-M. Both end portions 504-E1, 504-E2 are generally straight and they both extend radially outwardly away from the main winding portion 504-M. The two end portions 504-E1, 504-E2 are generally disposed on a mid-plane defined by the main winding portion 504A-M, which is generally parallel to the axis X and generally perpendicular to the center axial plane defined by the main winding portion 504A-M. The two end portions 504-E1, 504-E2 have generally the same extent of extension (length). Unlike the winding embodiment of FIGS. 25A and 25B, the end portions 504-E1, 504-E2 lack portions extending generally axially (parallel to the axis X) away from the center axial plane defined by the main winding portion 504-M.

Figure 30:
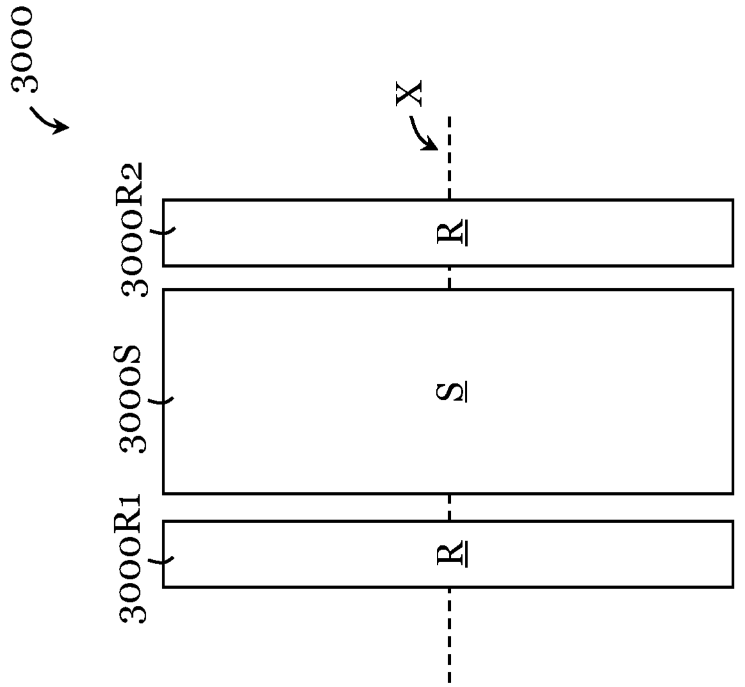
FIG. 30 is a schematic diagram of an axial flux machine.

FIG. 30 schematically illustrates an axial flux machine 3000. The axial flux machine 3000 includes a stator 3000S and two rotors 3000R1, 3000R2 disposed at opposite axial ends of the stator 3000S. The stator 3000S and the two rotors 3000R1, 3000R2 are arranged generally coaxially along axis X. Magnetic elements of the two rotors 3000R1, 3000R2 are arranged to be operably coupled with the stator 3000S. The stator 3000S and the two rotors 3000R1, 3000R2 may have the same radial dimension (e.g., the same radius). The stator 3000S may be the stator of the present invention, such as the ones in the embodiments of FIGS. 1 to 29.

The stator in one aspect of the invention can be used in an axial flux machine such as a motor or a generator. Thus, in another aspect, the invention also provides an axial flux machine that includes a (i.e., at least one) stator of the invention and a (i.e., at least one) rotor. For example, the axial flux machine may be a single or dual rotor axial flux machine. The axial flux machine incorporating the stator of the invention can be used in different electrical devices and systems, such as vehicles, tools, domestic appliances, etc. Thus, in yet another aspect, the invention also provides an electric device or system that includes a (i.e., at least one) axial flux machine that incorporates a (i.e., at least one) stator of the invention.

Some embodiments of the stator of the invention may provide one or more of the following example advantages. In some embodiments, the stator, with its layout of electrical interconnects, is arranged to enable more even reduction of outer diameter of the stator hence the stator housing and the axial flux machine that includes the stator. In some embodiments, the arrangement of the stator terminals along with the related electrical interconnects offset from the mid-plane between the two axial end planes of the stator allows the use of a stator housing or cover with improved mechanical strength. The skilled person appreciates that embodiments of the stator of the invention may provide one or more other advantages not specifically described.

It will be appreciated by a person skilled in the art that variations and/or modifications may be made to the described and/or illustrated embodiments of the invention to provide other embodiments of the invention. The described/ or illustrated embodiments of the invention should therefore be considered in all respects as illustrative, not restrictive. Features of the stator provided in different embodiments can be selectively combined as appropriate to provide further embodiments. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). For example, the number of stator bars and sets of windings may be different from those illustrated. For example, the shape, size, and/or configuration of stator bars and sets of windings may be different from those illustrated. For example, the stator can have any number of (two or more) sets of windings. For example, the shape, size, number and/or configuration of the tails of the sets of windings may be different from those illustrated. For example, the number of as well as the shape, size, and/or configuration of the components that provide the electrical interconnects may be different from those illustrated. For example, the electrical interconnects may be flat, with a rectangular, or squared, or rounded cross section.

The invention claimed is:

1. A stator for an axial flux machine, comprising:

a plurality of stator bars disposed generally radially around an axis;

a plurality of sets of windings, each set of windings being wound around a respective one of the plurality of stator bars and being operable to generate a magnetic field generally parallel to the axis; and electrical interconnects electrically connected with the plurality of sets of windings, wherein the electrical interconnects comprise a plurality of distinct portions circumferentially distributed around a radially outer periphery of the plurality of stator bars, with at least a portion extending both circumferentially and axially around a portion of the radially outer periphery;

wherein the plurality of sets of windings are each respectively formed by:

a main winding portion formed by one or more coil loops;

a first end portion extending directly from the main winding portion; and a second end portion extending directly from the main winding portion;

wherein at least one of the first end portion or the second end portion includes a generally U-shaped hook portion engaged with one or more portions of the electrical interconnects around the radially outer periphery of the plurality of stator bars, the U-shaped hook portion extending towards an axial mid-plane of the plurality of stator bars.

2. The stator of claim 1, wherein the electrical interconnects comprise radially outwardly disposed electrical interconnects disposed radially outwardly of the plurality of stator bars, each of the radially outwardly disposed electrical interconnects electrically connecting two or more of the plurality of sets of windings together.

3. The stator of claim 2, wherein the radially outwardly disposed electrical interconnects are disposed such that: in front view, the radially outwardly disposed electrical interconnects are substantially entirely distributed on at least one generally circular path that has a center generally corresponding to a location of the axis.

4. The stator of claim 2, wherein the radially outwardly disposed electrical interconnects are disposed such that: in front view, the radially outwardly disposed electrical interconnects are substantially entirely distributed on multiple generally circular paths, the multiple generally circular paths have different sizes and have generally the same center generally corresponding to a location of the axis.

5. The stator of claim 2, wherein the electrical interconnects consist only of the radially outwardly disposed electrical interconnects; and wherein the stator is completely devoid of radially inwardly disposed electrical interconnect disposed radially inwardly of the plurality of stator bars.

6. The stator of claim 2, wherein the plurality of sets of windings are electrically connected, via the electrical interconnects, in a multiphase arrangement; and wherein the stator further comprises a plurality of stator terminals electrically connected with at least some of the radially outwardly disposed electrical interconnects.

7. The stator of claim 6, wherein the plurality of stator bars define a center axial plane generally perpendicular to the axis; and wherein the plurality of stator terminals extend generally outwardly with respect to the axis and generally parallel to the center axial plane.

8. The stator of claim 7, wherein the plurality of stator bars define a center axial plane generally perpendicular to the axis; and wherein the plurality of stator terminals extend in one or more axial planes axially offset from and generally parallel to the center axial plane.

9. The stator of claim 6, further comprising:

a stator housing at least partly receiving the plurality of stator bars, the plurality of sets of windings, and the electrical interconnects, the stator housing defining a plurality of openings through which the plurality of stator terminals extend.

10. The stator of claim 6, further comprising:

a stator housing at least partly receiving the plurality of stator bars, the plurality of sets of windings, and the electrical interconnects, the stator housing defining a single opening through which the plurality of stator terminals extend.

11. The stator of claim 1, wherein the electrical interconnects comprise:

radially inwardly disposed electrical interconnects disposed radially inwardly of the plurality of stator bars, each of the radially inwardly disposed electrical interconnects electrically connecting two or more of the plurality of sets of windings together;

wherein the radially inwardly disposed electrical interconnects are collectively arranged circumferentially around an entire radially inner periphery of the plurality of stator bars.

12. The stator of claim 11, wherein the radially inwardly disposed electrical interconnects are disposed such that: in front view, the radially inwardly disposed electrical interconnects are substantially entirely distributed on one or more generally circular paths each with a center generally corresponding to a location of the axis.

13. The stator of claim 1, wherein the plurality of sets of windings are wound in the same sense.

14. The stator of claim 1, wherein the plurality of sets of windings comprises:

a plurality of first pairs of sets of windings wound in a first sense, each first pair of sets of windings including two sets of windings disposed immediately adjacent each other, and a plurality of second pairs of sets of windings wound in a second sense, each second pair of sets of windings including two sets of windings disposed immediately adjacent each other; and wherein the plurality of first pairs of sets of windings and the plurality of second pairs of sets of windings are arranged in an interleaved manner.

15. The stator of claim 1, wherein the first end portion and the second end portion are disposed:

on opposite lateral sides of the corresponding set of windings;

on generally the same lateral side of the corresponding set of windings; or in a mid-plane defined by the corresponding set of windings and generally parallel to the axis and generally perpendicular to an axial plane.

16. The stator of claim 1, wherein the first end portion and the second end portion are disposed radially outwardly of the main winding portion; or wherein the first end portion and the second end portion are disposed one radially outwardly of the main winding portion and another radially inwardly of the main winding portion.

17. The stator of claim 1, wherein the plurality of sets of windings are electrically connected, via the electrical interconnects, in a multi-phase arrangement.

18. The stator of claim 1, wherein each respective stator bar comprises at least one shoe portion for confining the corresponding set of windings wound around the stator bar.

19. The stator of claim 1, wherein a cross section of the electrical interconnects is rectangular, squared, or rounded.

20. An axial flux machine comprising:

the stator of claim 1; and a rotor.

21. The axial flux machine of claim 20, wherein the axial flux machine is a motor or a generator.

22. An electrical device or system comprising the axial flux machine of claim 20.

23. The stator of claim 1, wherein each of the first end portion and the second end portion respectively includes the generally U-shaped hook portion.

* * * * *